(12) United States Patent
Ueno et al.

(10) Patent No.: US 8,537,276 B2
(45) Date of Patent: Sep. 17, 2013

(54) IMAGE DISPLAYING DEVICE AND METHOD, AND IMAGE PROCESSING DEVICE AND METHOD FOR PREVENTING IMAGE DETERIORATION

(75) Inventors: Masafumi Ueno, Ikoma (JP); Kenichiroh Yamamoto, Chiba (JP); Takashi Yoshii, Chiba (JP); Hiroyuki Furukawa, Iga (JP)

(73) Assignee: Sharp Kabushiki Kaisha, Osaka (JP)

( * ) Notice: Subject to any disclaimer, the term of this patent is extended or adjusted under 35 U.S.C. 154(b) by 651 days.

(21) Appl. No.: 12/442,482

(22) PCT Filed: Feb. 19, 2007

(86) PCT No.: PCT/JP2007/052954
§ 371 (c)(1),
(2), (4) Date: Mar. 23, 2009

(87) PCT Pub. No.: WO2008/050492
PCT Pub. Date: May 2, 2008

(65) Prior Publication Data
US 2010/0026898 A1    Feb. 4, 2010

(30) Foreign Application Priority Data

Oct. 4, 2006  (JP) ................................ 2006-273183

(51) Int. Cl.
*H04N 7/01*    (2006.01)

(52) U.S. Cl.
USPC .......................................................... 348/441

(58) Field of Classification Search
USPC ................. 348/441, 448, 452, 458, 459, 447, 348/449, 700, 701, 607
See application file for complete search history.

(56) References Cited

U.S. PATENT DOCUMENTS 5,841,941 A    11/1998  Morimoto et al.
6,014,182 A *  1/2000   Swartz ........................... 348/700

(Continued)

FOREIGN PATENT DOCUMENTS

EP    2 066 122 A1    6/2009
EP    2 066 123 A1    6/2009

(Continued)

OTHER PUBLICATIONS

Tatsuro Yamauchi, "TV Standards Conversion", Journal of the Institute of Television Engineers of Japan, 1991, vol. 45, No. 12, pp. 1534-1543.

(Continued)

*Primary Examiner* — Paulos M Natnael
(74) *Attorney, Agent, or Firm* — Birch, Stewart, Kolasch & Birch, LLP

(57) ABSTRACT

Deterioration in image quality of a moving image obtained by special reproduction caused by frame rate conversion (FRC) processing of a motion compensation type is prevented. An image displaying device includes an FRC portion 10 that converts the number of frames of the input image signal by interpolating an image signal to which motion compensation processing has been performed between frames of an input image signal, a special reproduction determining portion 14 that determines whether or not the input image signal is an image signal relating to a predetermined genre, and a controlling portion 15. The FRC portion 10 includes a motion vector detecting portion lie that detects a motion vector between frames of the input image signal, an interpolation vector evaluating portion 11*f* that assigns an interpolation vector between frames based on the motion vector information, and an interpolation frame generating portion 12*d* that generates an interpolation frame from the interpolation vector. When the input image signal is an image signal obtained by special reproduction including "fast forward reproduction" and "rewind reproduction", the controlling portion 15 makes the motion compensation processing in the FRC portion 10 ineffective by making the motion vector detected by the motion vector detecting portion 11*e* to zero-vector.

35 Claims, 19 Drawing Sheets

(56) References Cited

U.S. PATENT DOCUMENTS

| | | | |
|---|---|---|---|
| 6,603,815 B2 * | 8/2003 | Suzuki et al. | 375/240.2 |
| 7,268,820 B2 * | 9/2007 | Honda et al. | 348/441 |
| 7,385,648 B2 * | 6/2008 | Grundmeyer et al. | 348/441 |
| 7,450,182 B2 * | 11/2008 | Nakajima et al. | 348/625 |
| 7,683,971 B2 * | 3/2010 | Han et al. | 348/452 |
| 7,738,037 B2 * | 6/2010 | Tang et al. | 348/441 |
| 7,773,677 B2 * | 8/2010 | Lee | 375/240.27 |
| 7,965,303 B2 * | 6/2011 | Hanaoka et al. | 345/606 |
| 8,013,935 B2 * | 9/2011 | Matsubara et al. | 348/448 |
| 8,018,998 B2 * | 9/2011 | Li et al. | 375/240.16 |
| 2001/0026591 A1 * | 10/2001 | Keren et al. | 375/240.26 |
| 2003/0035592 A1 | 2/2003 | Cornog et al. | |
| 2003/0161407 A1 * | 8/2003 | Murdock et al. | 375/240.29 |
| 2003/0210892 A1 | 11/2003 | Yoshida et al. | |
| 2004/0046891 A1 | 3/2004 | Mishima et al. | |
| 2004/0085480 A1 | 5/2004 | Salzer et al. | |
| 2004/0136686 A1 * | 7/2004 | Kono et al. | 386/46 |
| 2004/0252230 A1 | 12/2004 | Winder | |
| 2005/0062891 A1 * | 3/2005 | Tang et al. | 348/607 |
| 2005/0134735 A1 | 6/2005 | Swartz | |
| 2005/0162566 A1 * | 7/2005 | Chuang et al. | 348/714 |
| 2007/0165715 A1 * | 7/2007 | Yoshinari | 375/240.12 |
| 2008/0069219 A1 * | 3/2008 | Pearson et al. | 375/240.16 |
| 2008/0151103 A1 * | 6/2008 | Asamura et al. | 348/448 |
| 2009/0059068 A1 * | 3/2009 | Hanaoka et al. | 348/459 |
| 2010/0039557 A1 * | 2/2010 | Mori et al. | 348/459 |
| 2010/0118185 A1 * | 5/2010 | Furukawa et al. | 348/452 |

FOREIGN PATENT DOCUMENTS

| | | |
|---|---|---|
| EP | 2 066 124 A1 | 6/2009 |
| EP | 2 077 663 A1 | 7/2009 |
| JP | 4-302289 A | 10/1992 |
| JP | 8-130708 A | 5/1996 |
| JP | 2000-244929 A | 9/2000 |
| JP | 2000-259146 A | 9/2000 |
| JP | 2004-120757 A | 4/2004 |
| JP | 2004-159294 A | 6/2004 |
| JP | 2005-208613 A | 8/2005 |
| JP | 2005-301620 A | 10/2005 |
| WO | WO 03/036991 A1 | 5/2003 |

OTHER PUBLICATIONS

Ishiguro et al., "Consideration on Motion Picture Quality of the Hold Type Display with an octuple-rate CRT", Technical Report of IEICE, Institute of Electronics, Information and Communication Engineers, EID96-4, Jun. 1996, pp. 19-26.

Supplementary Partial European Search Report for corresponding application No. 07714480.6 dated Mar. 23, 2012.

* cited by examiner

IMAGE DISPLAYING DEVICE AND METHOD, AND IMAGE PROCESSING DEVICE AND METHOD FOR PREVENTING IMAGE DETERIORATION

TECHNICAL FIELD

The present invention relates to an image displaying device having a function for converting a frame rate or a field rate and a method thereof, and an image processing device and a method thereof, and more specifically to an image displaying device for preventing the deterioration in image quality of moving images obtained by a special reproduction that is caused by rate conversion processing of a motion compensation type, and an image displaying method by the device, and an image processing device and an image processing method by the device.

BACKGROUND OF THE INVENTION

As compared to a CRT (Cathode Ray Tube) that has been mainly used for the purpose of realizing moving images, an LCD (Liquid Crystal Display) has a drawback, that is, a motion blur, that when displaying an image in motion, outline of a moving part is perceived by a viewer out of focus. It is pointed out that the motion blur is caused by a display system itself of the LCD (see, for example, Japanese Patent No. 3295437; Hidekazu Ishiguro and Taiichiro Kurita, "Consideration on Motion Picture Quality of the Hold Type Display with an octuple-rate CRT", Technical Report of IEICE, Institute of Electronics, Information and Communication Engineers, EID96-4 (1996-06), pp. 19-26).

In the CRT which performs displaying with the light emitted from a phosphor caused by scanning electron beams, light emission of each pixel is almost an impulse although slight afterglow of the phosphor exists. This is called an impulse-type display system. On the other hand, in the case of LCD, an electric charge accumulated by application of an electric field to a liquid crystal is retained at a relatively high rate until an electric field is applied next time. Particularly, in the case of a TFT (Thin Film Transistor) system, a TFT switch is provided for each dot that constitutes a pixel, and auxiliary capacitance is further provided for each pixel generally, thus the capability of retaining accumulated charge is extremely high. Accordingly, light is consecutively emitted until a pixel is rewritten by application of an electric field based on image information of a next frame or field (hereinafter, represented by a frame). This is called a hold-type display system.

In the hold-type display system as described above, since impulse response of image display light has a temporal spread, time frequency characteristics are worsened with the deterioration of space frequency characteristics, accompanied and therefore a motion blur occurs. That is, since human eyes smoothly follow a moving object, when the light emission time is long like in the case of the hold type, motion of an image looks jerky and unnatural due to a time integration effect.

A technology is known, that an image is interpolated between frames to convert a frame rate (the number of frames/second: fps), in order to improve the motion blur in the above-described hold-type display system. This technology is called FRC (Frame Rate Converter) and is put into practical use in a liquid crystal displaying device and the like.

Conventionally, as a method for converting a frame rate, there are various methods such as simply repeating read-out of the same frame for a plurality of times, and interpolating a frame by straight-line interpolation between frames (linear interpolation) (see, for example, Tatsuro Yamauchi, "TV Standards Conversion", Journal of the Institute of Television Engineers of Japan, Vol. 45, No. 12, pp. 1534-1543 (1991)). However, in the case of frame interpolation processing by linear interpolation, unnaturalness (jerkiness, judder) accompanying frame rate conversion occurs, and the motion blur interference caused by the above-described hold-type display system, can not be sufficiently improved, and therefore, it is impossible to achieve sufficient image quality.

Hence, in order to improve quality of a moving image by eliminating influence of the above-described jerkiness and the like, processing of frame interpolation of a motion compensation type (motion compensation) using a motion vector is proposed. According to the motion compensation processing, a moving image itself is captured to perform compensation, thus making it possible to obtain a highly natural moving image without deteriorating resolution or generating the jerkiness. Further, since an interpolation image signal is formed with motion compensated, it is possible to sufficiently improve the motion blur interference caused by the above-described hold-type display system.

In the above-described Japanese Patent No. 3295437, a technology is disclosed, that by generating an interpolation frame motion-adaptively, a frame frequency of a display image is increased to improve deterioration in space frequency characteristics that causes a motion blur. In this technology, at least one interpolation image signal that is interpolated between frames of the display image is formed motion-adaptively from previous and subsequent frames so that the formed interpolation image signal is interpolated between frames and displayed sequentially.

FIG. 1 is a block diagram showing the schematic structure of an FRC driving display circuit in a conventional liquid crystal displaying device, and as shown in the figure, the FRC driving display circuit is constituted by including an FRC portion 100 for converting the number of frames of the input image signal by interpolating an image signal (a frame displayed in gray) which motion compensation processing is executed between frames of an input image signal, an active-matrix liquid crystal display panel 104 that has a liquid crystal layer and an electrode for applying a scanning signal and a data signal to the liquid crystal layer, and an electrode driving portion 103 for driving a scanning electrode and a data electrode of the liquid crystal display panel 104 based on an image signal to which frame rate conversion is performed by the FRC portion 100.

The FRC portion 100 includes a motion vector detecting portion 101 for detecting motion vector information from an input image signal, and an interpolation frame generating portion 102 for generating an interpolation frame based on the motion vector information obtained by the motion vector detecting portion 101.

In the above-described structure, the motion vector detecting portion 101 may obtain motion vector information, for example, using a block matching method, a gradient method, or the like, which will be described below, or when motion vector information is included in an input image signal in some way, this may be used. For example, since image data that is compressively encoded using an MPEG (Moving Picture Experts Group) system includes motion vector information of a moving image calculated in encoding, the structure to acquire the motion vector information may be employed.

FIG. 2 is a view illustrating frame rate conversion processing by the conventional FRC driving display circuit shown in FIG. 1. The FRC portion 100 of FIG. 1 generates interpolation frames between frames by motion compensation using motion vector information output by the motion vector detecting portion 101, and sequentially outputs the generated interpolation frame signal with an input frame signal. By means of this, processing of converting a frame rate of an input image signal, for example, from 60 frames per second (60 Hz) into 120 frames per second (120 Hz) is performed.

FIG. 3 is a view illustrating interpolation frame generation processing by the motion vector detecting portion 101 and the interpolation frame generating portion of FIG. 1. The motion vector detecting portion 101 detects a motion vector 105, for example, from a frame #1 and a frame #2 shown in FIG. 3 with a gradient method or the like. That is, the motion vector detecting portion measures a direction and an amount of motion in 1/60 second between the frame #1 and the frame #2 to obtain the motion vector 105. Next, the interpolation frame generating portion 102 uses the obtained motion vector 105 to assign an interpolation vector 106 between the frame #1 and the frame #2. By moving an object (an automobile in FIG. 3) from a position of the frame #1 to a position after the elapse of 1/120 second based on the interpolation vector 106, an interpolation frame 107 is generated.

In this way, by performing motion compensation frame interpolation processing using motion vector information to increase a display frame frequency, a display state of LCD (hold-type display system) can be put close to a display state of CRT (impulse-type display system), and it becomes possible to improve deterioration in image quality due to a motion blur caused when displaying a moving image.

Here, in the above-described motion compensation frame interpolation processing, it is essential to detect a motion vector for motion compensation. As the representative method for detecting a motion vector, for example, a block matching method, a gradient method, and the like are proposed. In these methods, a motion vector is detected for each pixel or small block between two consecutive frames, and each pixel or each small block of an interpolation frame between two frames is interpolated using the motion vector. That is, an image at an arbitrary position between two frames is interpolated at an corrected position to convert the number of frames.

Meanwhile, since a moving image has high correlation between frames and has continuity in a time axis direction, a pixel or a block moving in a certain frame is moved with a similar motion amount also in subsequent frames or previous frames in many cases. For example, in the case of a moving image in which a state that a ball rolls from right to left in a screen is photographed, an area of the ball is moved while having a similar motion amount in any frame. That is, between consecutive frames, a motion vector has continuity in many cases.

Accordingly, by referring to a detection result of a motion vector in a previous frame, it is possible to detect a motion vector in a subsequent frame more easily or more accurately. For example, an iterative gradient method, which is an improved version of a gradient method, uses a method in which calculation of the gradient method is repeated to a block to be detected by defining a motion vector of a neighboring block that has been detected in a previous frame or a current frame as an initial displacement vector and deciding it as a starting point. According to this method, it is possible to obtain a motion amount almost accurately by repeating the gradient method about twice.

Moreover, in a block matching method, it is considered to detect a motion vector efficiently by changing a search order referring to a detection result of a motion vector in a pervious frame. In this way, when detecting a motion vector, by using an already-detected motion vector, for example, it is possible to perform frame rate conversion in real time.

On the other hand, as the source of a video signal to be displayed on an image displaying device, in addition to a video by a general television broadcast, there also exists a video reproduced/transmitted by an externally connected video reproducing device (for example, a DVD (digital versatile disc) player, an HD (hard disc) player, or the like) or a video reproducing device built in the displaying device. Generally, a video reproducing device has special reproduction functions such as "fast forward reproduction" (high-speed and forward-direction reproduction), "rewind reproduction" (high-speed and reverse-direction reproduction), "slow reproduction", "frame advance reproduction", and "frame back reproduction", which can be instructed and operated by a user, and there is a case where an image signal converted into a special reproduction video by the video reproducing device is input.

Moreover, in recent years, with the progress of recording capacity of a recording medium (for example, a DVD, an HD and the like) and further more digitization of a transmission system, as a recording form of a video signal, for example, a digital compression signal formed by an MPEG system, or the like in which correlation between frames is removed is used.

The structure of the MPEG system represented by a digital compression signal will be described below. The prediction structure of inter frame compression used in the MPEG system is composed of I frame compressed only with data in a frame, P frame compressed by taking a difference from I frame or P frame, ahead, and B frame compressed by taking a difference from I frame or P frame, ahead and behind.

I frame is capable of restoring an image with data of itself, however, P frame and B frame need to restore an image using a frame defined as a reference (use for taking a difference) in compression. When a video signal recorded in the MPEG system is subjected to special reproduction such as "fast forward reproduction" and "rewind reproduction" by a video reproducing device, a method for reproduction by picking up only I frame capable of restoring only with data in the frame, a method for reproduction by generating an image for special reproduction using I, P, and B frames, and the like are realized (for example, refer to Japanese Laid-Open Patent Publication No. 8-130708).

DISCLOSURE OF THE INVENTION

Problems to be Solved by the Invention

When the above-described special reproduction using only I frame is realized (mainly in the case of high-speed fast forward reproduction and high-speed rewind reproduction), the same image may be displayed successively for some frames in some cases during the period from when a certain I frame is detected and an image restored based on the I frame is displayed to when a next I frame is detected and displayed.

Considering of applying frame rate conversion to such a video, a motion vector is detected in a frame where an I frame is detected, but no motion vector is detected between frames where a plurality of images of an I frame continue. Here, at the time of detecting a motion vector, as described above, a new motion vector is detected referring to a motion vector detected in a previous frame on the premise that there is continuity between frames of a video. Accordingly, there is a problem that detection error of a motion vector arises and an interpolation image deteriorates with respect to a special reproduction video in which the same image (still image) and an image in motion (moving image) continue one after another at an irregular interval as described above.

Moreover, also when an image for low-speed reproduction is generated using I, P, and B frames to realize special reproduction (mainly in the case of slow reproduction and frame advance reproduction), there is a case where the same image (still image) continues between a plurality of frames, and therefore, as described above, a problem arises that an error occurs in the detection of a motion vector and an interpolation image deteriorates.

Further, when an image for high-speed reproduction is generated using I, P, and B frames to realize special reproduction (mainly in the case of double speed reproduction, four-times speed reproduction, and the like), an image for high-speed reproduction is generated by extracting a frame from a normal reproduction image for every some frames. Thinking of a video in which some sort of moving object is photographed, there is a case where a motion amount of an object between image frames at the time of high-speed reproduction becomes several times greater than a motion amount of an object between image frames at the time of normal reproduction.

Considering of applying frame rate conversion to such a video, since a correlation between respective frames is low (a motion amount is excessive), there is a problem that a motion vector is hardly detected, an error occurs in the detection of a motion vector, and an interpolation image deteriorates.

As described above, in an image signal to which special reproduction was given by a video reproducing device, since there is a possibility that a plurality of same images continue, or that a motion amount between frames is great, when frame rate conversion (FRC) processing of a motion compensation type is applied to such an image signal, there is a problem that an error occurs in the detection of a motion vector and deterioration in image quality of a display image is caused.

The present invention has been made in view of the above-described problems, and aims to provide an image displaying device capable of preventing the deterioration in image quality of a moving image obtained by special reproduction that is caused by frame rate conversion (FRC) processing of a motion compensation type and a method thereof, and an image processing device and a method thereof.

Means for Solving the Problems

A first invention of the present application is an image displaying device having rate converting portion that converts the number of frames or fields of an input image signal by interpolating an image signal to which motion compensation processing has been given between frames or fields of the input image signal and outputs the input image signal with the number of frames or fields converted to a display panel, wherein a determining portion that determines whether or not the input image signal is an image signal obtained by special reproduction is included, and when the determining portion determines that the input image signal is an image signal obtained by special reproduction, image interpolation by the motion compensation processing is not performed.

A second invention of the present application is the image displaying device, wherein the rate converting portion comprises a portion that generates an interpolation image signal to which the motion compensation processing has been performed based on the motion vector information between consecutive frames or fields included in the input image signal, and when the determining portion determines that the input image signal is an image signal obtained by special reproduction, the motion compensation processing in the portion for generating the interpolation image signal is made ineffective.

A third invention of the present application is the image displaying device, wherein the rate converting portion comprises a motion vector detecting portion that detects motion vector information between consecutive frames or fields included in the input image signal, an interpolation vector assigning portion that assigns an interpolation vector between the frames or the fields based on the detected motion vector information, an interpolation image generating portion that generates an interpolation image signal using the assigned interpolation vector, and an image interpolating portion that interpolates the generated interpolation image signal between the frames or the fields.

A fourth invention of the present application is the image displaying device, wherein when the determining portion determines that the input image signal is an image signal obtained by special reproduction, the motion compensation processing is made ineffective by making the motion vector detected by the motion vector detecting portion to zero-vector.

A fifth invention of the present application is the image displaying device, wherein when the determining portion determines that the input image signal is an image signal obtained by special reproduction, the motion compensation processing is made ineffective by making the interpolation vector assigned by the interpolation vector assigning portion to zero-vector.

A sixth invention of the present application is the image displaying device, wherein when the determining portion determines that the input image signal is an image signal obtained by special reproduction, the input image signal is output to the display panel without converting the number of frames or fields of the input image signal.

A seventh invention of the present application is the image displaying device, wherein a driving frequency of the display panel for displaying an image signal is variable, and when the determining portion determines that the input image signal is an image signal obtained by special reproduction, the driving frequency of the display panel is changed in accordance with a frame frequency or a field frequency of the input image signal.

An eighth invention of the present application is the image displaying device, wherein another rate converting portion that converts the number of frames or fields of the input image signal by inserting an image signal to which motion compensation processing has not been given between the frames or the fields of the input image signal is included, and when the determining portion determines that the input image signal is an image signal obtained by special reproduction, the image signal with the number of frames or fields converted by the another rate converting portion is output to the display panel.

A ninth invention of the present application is the image displaying device, wherein the another rate converting portion converts the number of frames or fields of the input image signal by inserting an image signal of the frames or the fields between the frames or the fields of the input image signal.

A tenth invention of the present application is the image displaying device, wherein the another rate converting portion converts the number of frames or fields of the input image signal by interpolating an image signal to which linear interpolation processing has been given between the frames or the fields of the input image signal.

An eleventh invention of the present application is the image displaying device, wherein the another rate converting portion converts the number of frames or fields of the input image signal by inserting a predetermined monochrome image signal between the frames or the fields of the input image signal.

A twelfth invention of the present application is the image displaying device, wherein the image signal obtained by special reproduction is an image signal obtained by fast forward reproduction.

A thirteenth invention of the present application is the image displaying device, wherein the image signal obtained by special reproduction is an image signal obtained by rewind reproduction.

A fourteenth invention of the present application is the image displaying device, wherein the image signal obtained by special reproduction is an image signal obtained by frame advance reproduction.

A fifteenth invention of the present application is the image displaying device, wherein the image signal obtained by special reproduction is an image signal obtained by slow reproduction.

A sixteenth invention of the present application is an image displaying method having a step of converting the number of frames or fields of an input image signal by interpolating an image signal to which motion compensation processing has been given between frames or fields of the input image signal, wherein whether or not the input image signal is an image signal obtained by special reproduction is determined, and when it is determined that the input image signal is an image signal obtained by special reproduction, image interpolation by the motion compensation processing is not performed.

A seventeenth invention of the present application is the image displaying method, wherein the step of converting the number of frames or fields of the input image signal comprises a process of generating an interpolation image signal to which the motion compensation processing has been performed based on the motion vector information between consecutive frames or fields included in the input image signal, and when it is determined that the input image signal is an image signal obtained by special reproduction, the motion compensation processing at the step of generating the interpolation image signal is made ineffective.

An eighteenth invention of the present application is the image displaying method, wherein when it is determined that the input image signal is an image signal obtained by special reproduction, a driving frequency of a display panel is changed in accordance with a frame frequency or a field frequency of the input image signal.

A nineteenth invention of the present application is the image displaying method, wherein when it is determined that the input image signal is an image signal obtained by special reproduction, the number of frames or fields of the input image signal is converted by inserting an image signal of the frames or the fields between the frames or the fields of the input image signal A twentieth invention of the present application is the image displaying method, wherein when it is determined that the input image signal is an image signal obtained by special reproduction, the number of frames or fields of the input image signal is converted by interpolating an image signal to which linear interpolation processing has been performed between the frames or the fields of the input image signal.

A twenty-first invention of the present application is the image displaying method, wherein when it is determined that the input image signal is an image signal obtained by special reproduction, the number of frames or fields of the input image signal is converted by inserting a predetermined monochrome image signal between the frames or the fields of the input image signal.

A twenty-second invention of the present application is an image processing device having rate converting portion that converts the number of frames or fields of the input image signal by interpolating an image signal to which motion compensation processing has been performed between frames or fields of an input image signal, wherein when it is determined that the input image signal is an image signal obtained by special reproduction by a determining portion that determines whether or not the input image signal is an image signal obtained by special reproduction, image interpolation by the motion compensation processing is not performed.

A twenty-third invention of the present application is the image processing device, wherein the rate converting portion comprises a portion that generates an interpolation image signal to which the motion compensation processing has been performed based on the motion vector information between consecutive frames or fields included in the input image signal, and when it is determined that the input image signal is an image signal obtained by special reproduction, the motion compensation processing in the portion for generating the interpolation image signal is made ineffective.

A twenty-fourth invention of the present application is the image processing device, wherein when determining portion determines that the input image signal is an image signal obtained by special reproduction, the input image signal is output without converting the number of frames or fields of the input image signal.

A twenty-fifth invention of the present application is the image processing device, wherein another rate converting portion that converts the number of frames or fields of the input image signal by inserting an image signal to which motion compensation processing has not been given between the frames or the fields of the input image signal is included, and when it is determined that the input image signal is an image signal obtained by special reproduction, the number of frames or fields of the input image signal is converted by the another rate converting portion.

A twenty-sixth invention of the present application is the image processing device, wherein another rate converting portion that converts the number of frames or fields of the input image signal by inserting an image signal to which motion compensation processing has not been given between the frames or the fields of the input image signal is included, and when it is determined that the input image signal is an image signal obtained by special reproduction, the number of frames or fields of the input image signal is converted by the another rate converting portion converts.

A twenty-seventh invention of the present application is the image processing device, wherein the another rate converting portion converts the number of frames or fields of the input image signal by interpolating an image signal to which linear interpolation processing has been given between the frames or the fields of the input image signal.

A twenty-eighth invention of the present application is the image processing device, wherein the another rate converting portion converts the number of frames or fields of the input image signal by inserting a predetermined monochrome image signal between the frames or the fields of the input image signal.

A twenty-ninth invention of the present application is a image processing method having a step of converting the number of frames or fields of an input image signal by interpolating an image signal to which motion compensation processing has been given between frames or fields of the input image signal, wherein whether or not the input image signal is an image signal obtained by special reproduction is determined, and when it is determined that the input image signal is an image signal obtained by special reproduction, image interpolation by the motion compensation processing is not performed.

A thirtieth invention of the present application is the image processing method wherein the step of converting the number of frames or fields of the input image signal comprises a process of generating an interpolation image signal to which motion compensation processing to been performed based on the motion vector information between consecutive frames or fields included in the input image signal, and when it is determined that the input image signal is an image signal obtained by special reproduction, the motion compensation processing at the step of generating the interpolation image signal is make ineffective.

A thirty-first invention of the present application is an image displaying device having rate converting portion that converts the number of frames or fields of an input image signal by interpolating an image signal to which motion compensation processing has been given between frames or fields of the input image signal and outputs the input image signal with the number of frames or fields converted to a display panel, wherein a determining portion that determines whether or not the input image signal is an image signal obtained by special reproduction is included, and when the determining portion determines that the input image signal is an image signal obtained by special reproduction, compensation intensity of the motion compensation processing is lowered.

A thirty-second invention of the present application is the image displaying device, wherein the rate converting portion has an interpolation image generating portion that generates an interpolation image signal by performing weighted addition of an image signal to which motion compensation processing has been given and an image signal to which motion compensation processing has not been given at a predetermined ratio, and when the determining portion determines that the input image signal is an image signal obtained by special reproduction, the weighted addition ratio is varied A thirty-third invention of the present application is the image displaying device, wherein the interpolation image generating portion takes the image signal to which motion compensation processing has not been given as an interpolation image signal, when the determining portion determines that the input image signal is an image signal obtained by special reproduction, and takes the image signal to which motion compensation processing has been given as an interpolation image signal when the determining portion determines that the input image signal is not an image signal obtained by special reproduction.

A thirty-fourth invention of the present application is the image displaying device, wherein the interpolation image generating portion uses an image signal to which linear interpolation processing has been performed as the image signal to which the motion compensation processing has not been performed.

A thirty-fifth invention of the present application is the image displaying device, wherein the image signal obtained by special reproduction is an image signal obtained by fast forward reproduction.

A thirty-sixth invention of the present application is the image displaying device, wherein the image signal obtained by special reproduction is an image signal obtained by rewind reproduction.

A thirty-seventh invention of the present application is the image displaying device, wherein the image signal obtained by special reproduction is an image signal obtained by frame advance reproduction.

A thirty-eighth invention of the present application is the image displaying device, wherein the image signal obtained by special reproduction is an image signal obtained to slow reproduction.

A thirty-ninth invention of the present application is an image displaying method having a step of converting the number of frames or fields of an input image signal by interpolating an image signal to which motion compensation processing has been given between frames or fields of the input image signal, wherein whether or not the input image signal is an image signal obtained by special reproduction is determined, and when it is determined that the input image signal is an image signal obtained by special reproduction, compensation intensity of the motion compensation processing is lowered.

A fortieth invention of the present application is an image processing device having rate converting portion that converts the number of frames or fields of the input image signal by interpolating an image signal to which motion compensation processing has been performed between frames or fields of an input image signal, wherein when it is determined that the input image signal is an image signal obtained by special reproduction by a determining portion that determines whether or not the input image signal is an image signal obtained by special reproduction, compensation intensity of the motion compensation processing is lowered.

A forty-first invention of the present application is a image processing method having a step of converting the number of frames or fields of an input image signal by interpolating an image signal to which motion compensation processing has been given between frames or fields of the input image signal, wherein whether or not the input image signal is an image signal obtained by special reproduction is determined, and when it is determined that the input image signal is an image signal obtained by special reproduction, compensation intensity of the motion compensation processing is lowered.

Effect of the Invention

According to the present invention, it is possible to prevent deterioration in image quality of a display image effectively by not performing interpolation processing by motion compensation, when an image signal obtained by special reproduction (such as "fast forward reproduction" and "rewind reproduction") is input in an image reproducing device.

EXPLANATIONS OF REFERENCE NUMERALS

10, 100 . . . frame rate converting (FRC) portion, 11 . . . vector detecting portion, 11*a* . . . luminance signal extracting portion, 11*b* . . . preprocessing filter, 11*c* . . . frame memory for motion detection, 11*d* . . . initial vector memory, 11*e*, 101 . . . motion vector detecting portion, 11*f* . . . interpolation vector evaluating portion, 12 . . . frame generating portion, 12*a* . . . frame memory for interpolation, 12*b*, 102 . . . interpolation frame generating portion, 12*c* . . . frame memory for time base conversion, 12*d* . . . time base converting portion, 12*e* . . . compensation intensity varying portion, 14 . . . special reproduction determining portion, 15 . . . controlling portion, 16 . . . switching portion, 17 . . . zero-vector, 18, 103 . . . electrode driving portion, 19, 104 . . . liquid crystal display panel, 20 . . . path, 21 . . . memory, 22 . . . linear interpolation processing portion, 23 . . . black level signal insertion processing portion, 105 . . . motion vector 106 . . . interpolation vector, 107 . . . interpolation frame

PREFERRED EMBODIMENTS OF THE INVENTION

Now, preferred embodiments of an image displaying device according to the present invention will hereinafter be described in detail referring to the accompanying drawings.

Note that, although the present invention is applicable to any of a field signal and an interpolation field signal, and a frame signal and an interpolation frame signal, since both of them (field and frame) have the similar relationship each other, description will be given with a frame signal and an interpolation frame signal as a representative example.

Figure 1:
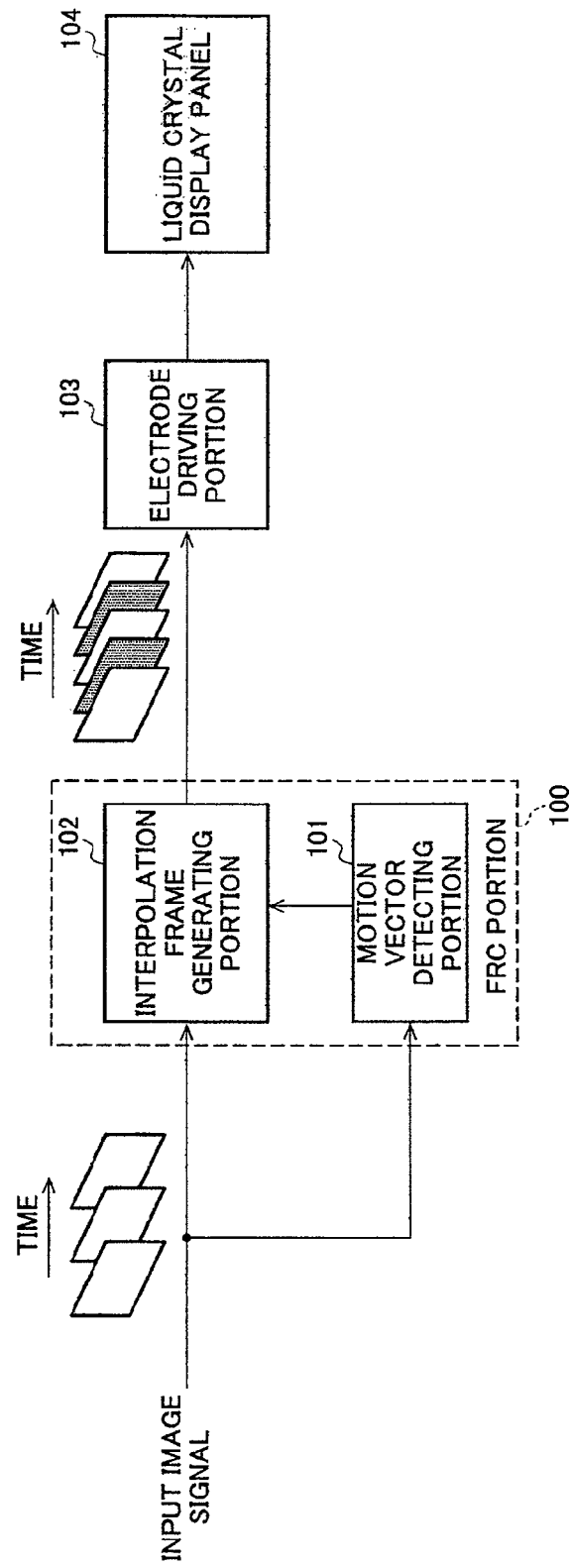
FIG. 1 is a block diagram showing the schematic structure of an FRC driving display circuit in a conventional liquid crystal displaying device.
Figure 2:
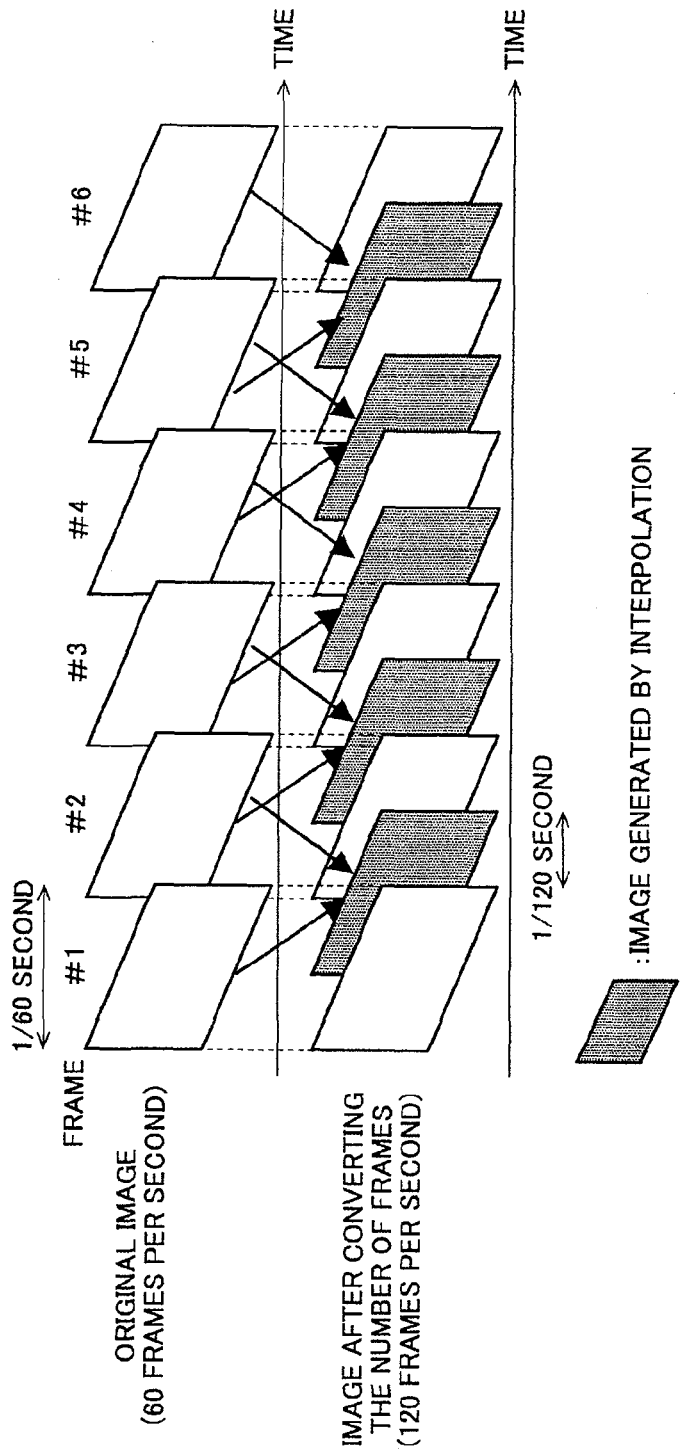
FIG. 2 is a view illustrating frame rate conversion processing by the conventional FRC driving display circuit shown in FIG. 1.
Figure 3:
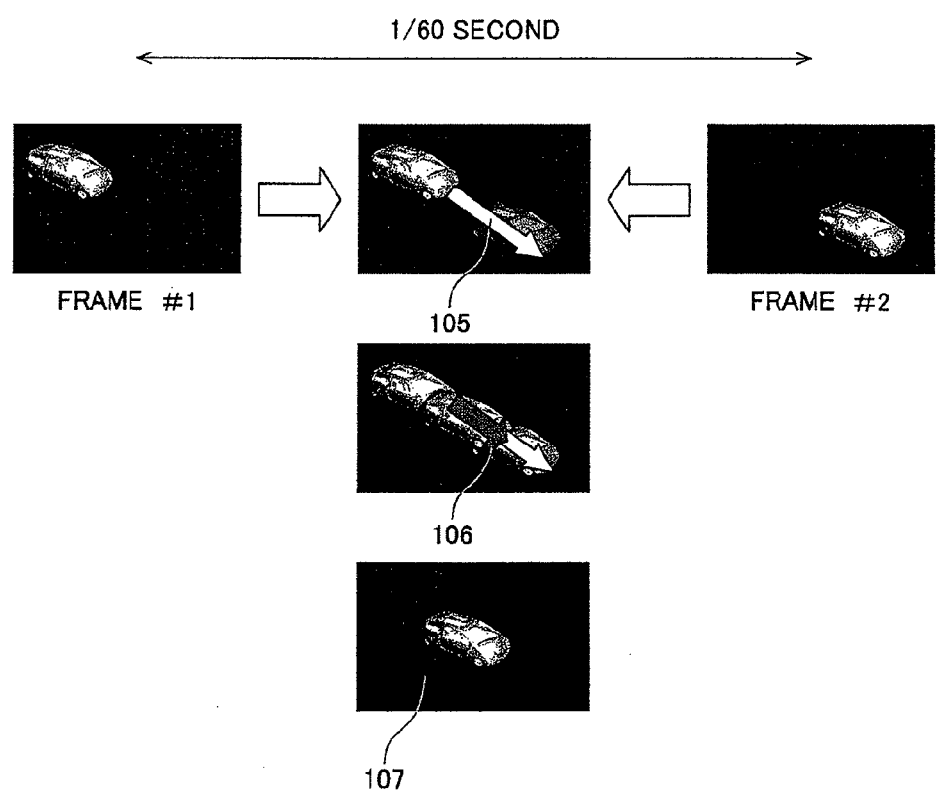
FIG. 3 is a view illustrating interpolation frame generation processing by a motion vector detecting portion and an interpolation frame generating portion.
Figure 4:
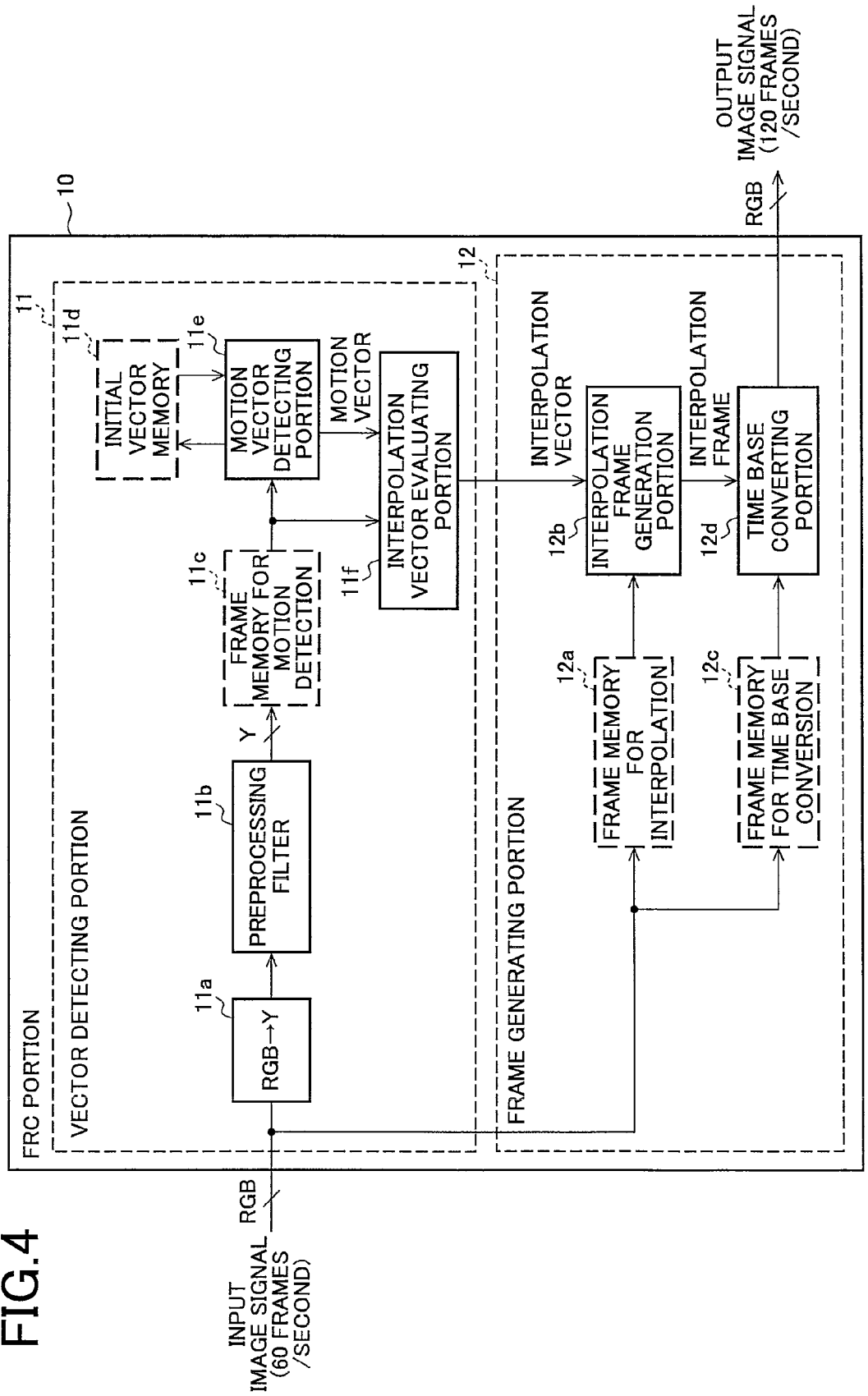
FIG. 4 is a block diagram showing a structural example of a frame rate converting portion provided in an image displaying device of the present invention.

FIG. 4 is a block diagram showing a structural example of frame rate converting portion of the motion compensation type provided in the image displaying device of the present invention. In FIG. 4, 10 denotes a frame rate converting portion (hereinafter, referred to as an FRC portion), and the FRC portion 10 corresponds to rate converting portion of the present invention and comprises a vector detecting portion 11 for detecting a motion vector between two consecutive frames included in an input image signal, and a frame generating portion 12 for generating an interpolation frame (interpolation image) based on the detected motion vector. Note that, an example when an iterative gradient method is used for detection of a motion vector will be shown for the vector detecting portion 11, however, a block matching method or the like may be used without restriction to the iterative gradient method.

Here, a feature of the iterative gradient method is that it is possible to detect several kinds of motion amounts and to detect a motion vector even of a moving object occupying a small area since the method can detect a motion vector by a block. It is also possible to realize the small-scale circuit structure for the method compared with those for other methods (such as a block matching method). The iterative gradient method uses a method that repeats the calculation of a gradient method to a block to be detected by using a motion vector of a neighboring block that has been already detected as an initial deviation vector and defining it as a starting point. According to this method, it is possible to obtain a motion amount almost accurately by repeating the gradient method about two times.

In FIG. 4, the vector detecting portion 11 comprises a luminance signal extracting portion 11*a* for extracting a luminance signal (Y signal) from an input image signal (RGB signal), a preprocessing filter 11*b* for applying LPF (Low-pass Filter) to the extracted Y signal to restrict a high bandwidth, a frame memory for motion detection 11*c*, an initial vector memory 11*d* for accumulating an initial vector candidate, a motion vector detecting portion 11*e* for detecting a motion vector between frames using an iterative gradient method, and an interpolation vector evaluating portion 11*f* for assigning an interpolation vector between frames based on the detected motion vector.

Note that, the FRC portion 10 corresponds to the rate converting portion of the present invention, the motion vector detecting portion 11*e* corresponds to the motion vector detecting portion of the present invention, and the interpolation vector evaluating portion 11*f* corresponds to the interpolation vector assigning portion of the present invention.

Since the calculation of the above-described iterative gradient method is susceptible to noises due to the use of a differential component of a pixel, and increases calculation errors when large gradient variations exist in a detection block, LPF is applied to the preprocessing filter 11*b* to restrict a high bandwidth. A motion vector that has been already detected in the frame previous to the last one (initial vector candidate) is accumulated, as the initial vector candidate, in the initial vector memory 11*d*.

The motion vector detecting portion 11*e* selects, as an initial vector, a motion vector closest to the motion vector of the block to be detected from initial vector candidates stored in the initial vector memory 11*d*. That is, an initial vector is selected using a block matching method from already-detected motion vectors (initial vector candidates) in a block near the block to be detected. Then, the motion vector detecting portion 11e detects a motion vector between a previous frame and a current frame by means of a gradient method calculation using the selected initial vector as a starting point.

The interpolation vector evaluating portion 11f evaluates the motion vector detected by the motion vector detecting portion 11e and assigns the optimum interpolation vector to an interpolation block between frames based on the evaluation result to output to the frame generating portion 12.

The frame generating portion 12 comprises a frame memory for interpolation 12a for storing two input frames (the last frame and current frame), an interpolation frame generating portion 12b for generating an interpolation frame based on the two input frames from the frame memory for interpolation 12a and the interpolation vector from the interpolation vector evaluating portion 11f, a frame memory for time base conversion 12c for storing input frames (the last frame and current frame), and a time base converting portion 12d for generating an output image signal (RGB signal) by inserting the interpolation frame from the interpolation frame generating portion 12b into the input frames from the frame memory for time base conversion 12c.

Note that, the interpolation frame generating portion 12b corresponds to the interpolation image generating portion of the present invention, and the time base converting portion 12d corresponds to the image interpolating portion of the present invention.

Figure 5:
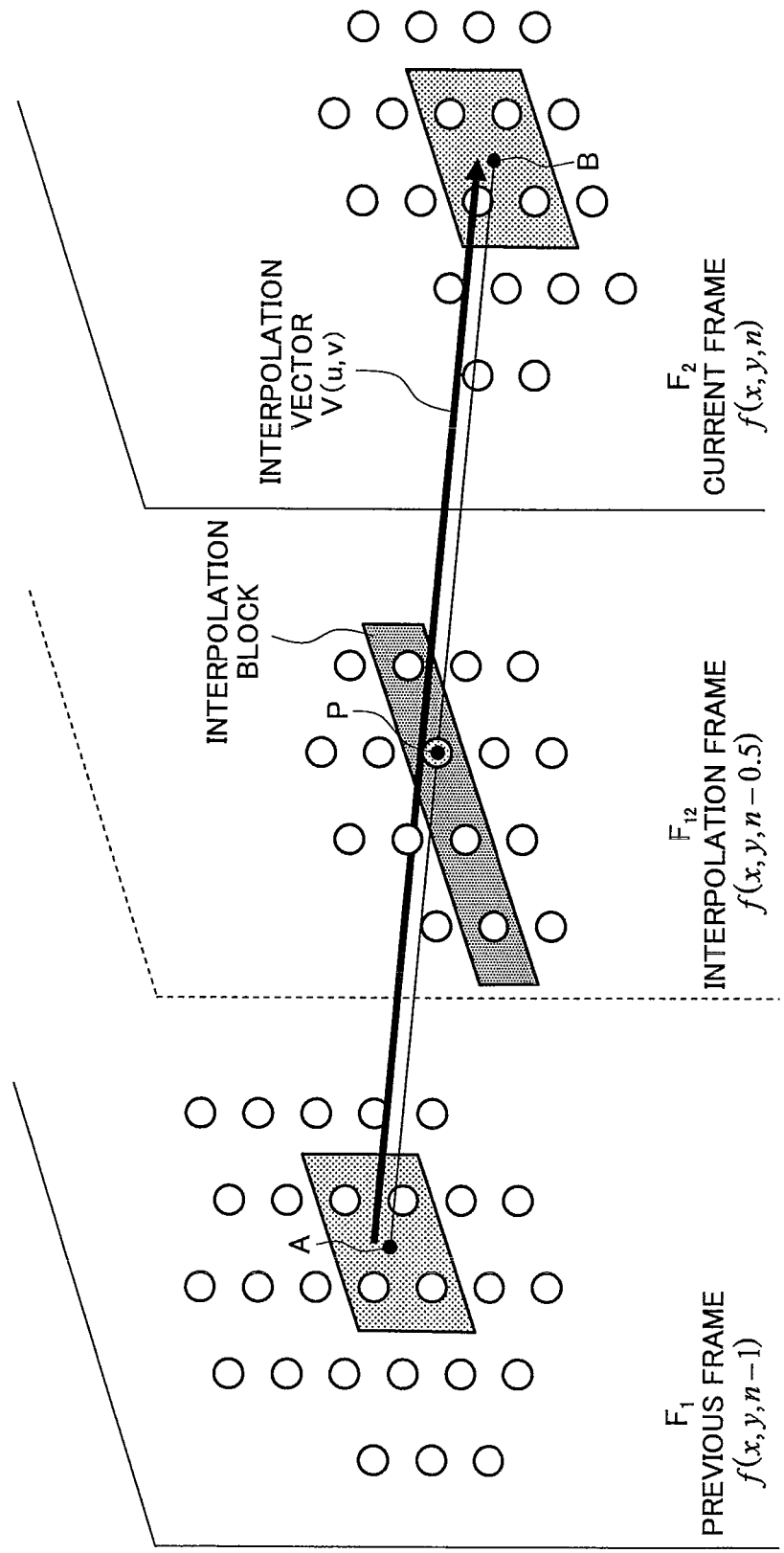
FIG. 5 is a view illustrating an example of interpolation frame generation processing by a frame generating portion.

FIG. 5 is a view illustrating an example of interpolation frame generation processing by the frame generating portion 12. The interpolation frame generating portion 12b extends an interpolation vector V assigned to an interpolation block $B_{12}$ into the last frame $F_1$ and the current frame $F_2$ to interpolate each pixel within an interpolation block using a pixel in a vicinity of an intersection point with each frame. For example, in the last frame $F_1$ (f (x, y, n−1)), the luminance of the point A is calculated from three adjacent points.

In the current frame $F_2$ (f (x, y, n)), the luminance of the point B is calculated from three adjacent points. In the interpolation frame $F_{12}$ (f (x, y, n−0.5)), the luminance of the point P is obtained by the interpolation using the luminances of the point A and the point B. The luminance of the point P may be an average of, for example, the luminance of the point A and the luminance of the point B.

The interpolation frame $F_{12}$ generated as described above is transmitted to the time base converting portion 12d. The time base converting portion 12d sandwiches the interpolation frame $F_{12}$ between the last frame $F_1$ and the current frame $F_2$ and performs processing for converting a frame rate. In this way, it is possible to convert an input image signal (60 frames/second) into a motion compensated output image signal (120 frames/second) by the FRC portion 10, and by outputting it to a display panel, it is possible to reduce a motion blur and improve quality of a moving image. Note that, here, description has been given for the case where an input image signal of 60 frames/second is changed into an output image signal of 120 frames/second (twice) by the frame rate conversion, however, it is needless to say that it is also applicable to obtain an output image signal of 90 frames/second (one and a half times) or 180 frames/second (three times), for example.

The image displaying device of the present invention includes the FRC portion 10 shown in FIG. 4, and has a primary object to prevent deterioration in image quality caused by FRC processing by making the motion compensation processing in the FRC portion 10 ineffective, when an input image signal is an image signal having a possibility that more than one same image continues or an image signal having a possibility that a motion amount between frames is large, such as an image signal obtained by special reproduction. Note that, the present invention is applicable to overall image displaying devices having display characteristics of a hold type such as a liquid crystal display, an organic EL display, and an electrophoretic display, but in each of the embodiments below, description will be given taking a case where the present invention is applied to a liquid crystal displaying device using a liquid crystal display panel as a display panel as a representative example.

First Embodiment

In a first embodiment of the present invention, when an input image signal is an image signal obtained by special reproduction including "fast forward reproduction", "rewind reproduction", "slow reproduction", and "frame advance reproduction", for example, in a video reproducing device, an output of the motion vector detecting portion 11e is made to zero-vector forcibly in order to make the motion compensation processing in the FRC portion 10 ineffective.

Figure 6:
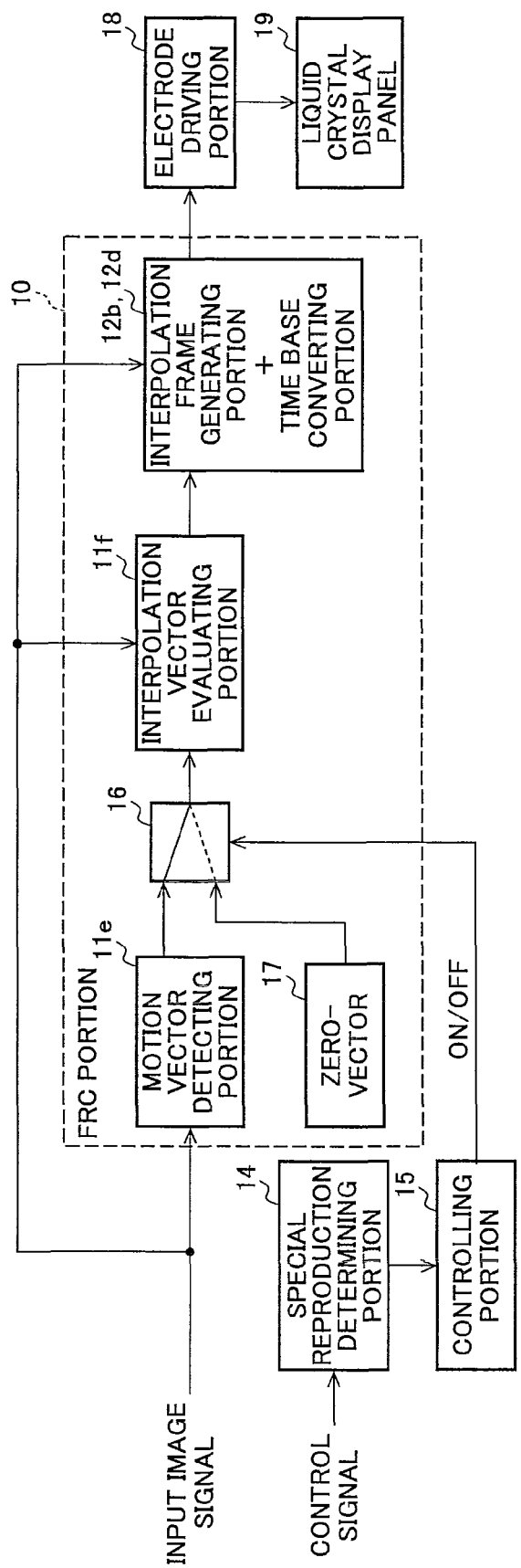
FIG. 6 is a block diagram showing an example of the structure of the essential parts of a liquid crystal displaying device according to a first embodiment of the present invention.

FIG. 6 is a block diagram showing an example of the structure of the essential parts of a liquid crystal displaying device according to the first embodiment of the present invention, and the liquid crystal displaying device comprises a FRC portion 10, a special reproduction determining portion 14, a controlling portion 15, a switching portion 16, a zero-vector portion 17, an electrode driving portion 18, and a liquid crystal display panel 19. The switching portion 16 is provided between the motion vector detecting portion 11e and the interpolation vector evaluating portion 11f in the FRC portion 10, and switches over a motion vector from the motion vector detecting portion 11e to zero-vector 17 in accordance with an instruction from the controlling portion 15.

For example, when the liquid crystal displaying device and a video reproducing device are externally connected and a signal line capable of transmitting and receiving a control signal in addition to a video and voice from the video reproducing device is connected to the liquid crystal displaying device, the special reproduction determining portion 14 obtains and analyzes the control signal to determine a reproduction state (normal reproduction/special reproduction) of the video reproducing device.

Note that, when the liquid crystal displaying device and the video reproducing device are connected by a control signal line and it is possible to operate both devices with one remote control device, it is also possible to configure so that a remote control signal transmitted from the remote control device is obtained and analyzed to determine a reproduction state (normal reproduction/special reproduction) of the video reproducing device.

In addition, when special reproduction information indicating that an image signal was obtained by special reproduction is added to the image signal reproduced by the video reproducing device, it is also possible to configure so as to determine whether or not an input image signal is an image signal obtained by special reproduction in the video reproducing device using the special reproduction information.

Further, it is also possible to determine whether or not the input image signal is an image signal obtained by special reproduction in the video reproducing device by detecting, for example, that an input image signal is an image signal that more than one same image continues or an image signal that a motion amount between frames is large, based on a cycle at which a signal indicating that the difference obtained between frames (fields) of an input image signal is large or a signal indicating that that difference is small is output.

As described above, the special reproduction determining portion 14 has only to determine whether or not an input image signal to be displayed is the one obtained by special reproduction in the video reproducing device, and it is needless to say that it is not restricted to the above-described structure. In addition, the liquid crystal displaying device of the present embodiment determines whether or not an input image signal to be displayed is the one obtained by special reproduction in the video reproducing device, and controls motion compensation processing in the FRC portion 10 depending on the determination result.

The liquid crystal display panel 19 is an active-matrix type liquid crystal display that has a liquid crystal layer and an electrode for applying a scanning signal and a data signal to the liquid crystal layer. The electrode driving portion 18 is a display driver for driving a scanning electrode and a data electrode of the liquid crystal display panel 19 based on an image signal to which frame rate conversion has been performed by the FRC portion 10. The controlling portion 15 includes a CPU for controlling each portion described above, and controls so as to make motion compensation processing in the FRC portion 10 ineffective when the special reproduction determining portion 14 determines that an input image signal is an image signal obtained by special reproduction.

A driving frequency of the liquid crystal display panel 19 becomes a frame frequency converted by the FRC portion 10. Accordingly, when an image signal input with a frame frequency of 60 Hz is converted so as to have a frame frequency of 120 Hz in the FRC portion 10, the driving frequency of the liquid crystal display panel 19 becomes 120 Hz. However, when frame frequency conversion by FRC processing is not performed and when an input image signal is displayed and output as it is, the driving frequency of the liquid crystal display panel 19 is a frame frequency of the input image signal.

When the special reproduction determining portion 14 determines that an input image signal is an image signal obtained by special reproduction, the controlling portion 15 switches the switching portion 16 to the side of the zero-vector 17 and replaces a motion vector detected by the motion vector detecting portion 11e with zero-vector forcibly. Moreover, when the special reproduction determining portion 14 determines that an input image signal is an image signal obtained by normal reproduction (reproduced at a normal speed in a forward direction), the switching portion 16 is switched to the side of the motion vector detecting portion 11e to input a motion vector detected by the motion vector detecting portion 11e to the interpolation vector evaluating portion 11f.

In this way, it is possible to improve quality of a moving image by FRC processing of a motion compensation type at the time of ordinary display of a moving image, and when an image signal obtained by special reproduction is input, that is, when an image signal having a possibility that more than one same image continues or an image signal having a possibility that a motion amount between frames is large is input, it is possible to eliminate detection error of a motion vector, motion compensation error, and the like due to discontinuity of motion of an image and large amount of motion between frames and to effectively prevent deterioration in image quality caused by FRC processing of a motion compensation type by making a motion vector to zero-vector and making motion compensation processing ineffective.

Second Embodiment

In a second embodiment of the present invention, when an input image signal is an image signal obtained by special reproduction including "fast forward reproduction", "rewind reproduction", "slow reproduction", and "frame advance reproduction" in a video reproducing device, for example, an interpolation vector from the interpolation vector evaluating portion 11f is made to zero-vector so as not to cause interpolation between pixels at different positions in order to make motion compensation processing in the FRC portion 10 ineffective.

Figure 7:
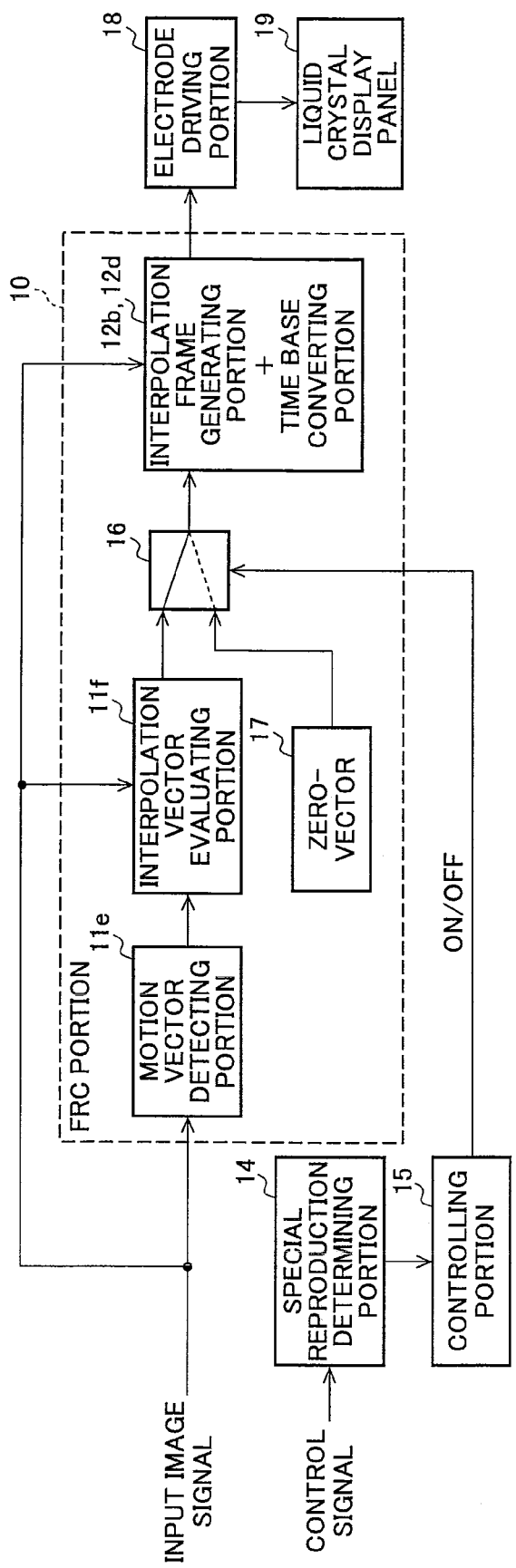
FIG. 7 is a block diagram showing an example of the structure of the essential parts of a liquid crystal displaying device according to a second embodiment of the present invention.

FIG. 7 is a block diagram showing an example of the structure of the principle part of a liquid crystal displaying device according to the second embodiment of the present invention, and the liquid crystal displaying device comprises the FRC portion 10, the special reproduction determining portion 14, the controlling portion 15, the switching portion 16, the zero-vector portion 17, the electrode driving portion 18, and the liquid crystal display panel 19. The switching portion 16 is provided between the interpolation vector evaluating portion 11f and the interpolation frame generating portion 12b in the FRC portion 10, and switches over an interpolation vector from the interpolation vector evaluating portion 11f to the zero-vector 17 in accordance with an instruction from the controlling portion 15.

When the special reproduction determining portion 14 determines that an input image signal is an image signal obtained by special reproduction, the controlling portion 15 switches the switching portion 16 to the side of the zero-vector 17 and makes an interpolation vector assigned by the interpolation vector evaluation portion 11f to zero-vector. Moreover, when the special reproduction determining portion 14 determines that an input image signal is an image signal obtained by normal reproduction, the controlling portion 15 switches the switching portion 16 to the side of the interpolation vector evaluation portion 11f and inputs an interpolation vector assigned by the interpolation vector evaluation potion 11f to the interpolation frame generating portion 12b.

In this way, it is possible to improve quality of a moving image by FRC processing of a motion compensation type at the time of ordinary display of a moving image. Along with that, when an image signal obtained by special reproduction is input, that is, when an image signal having a possibility that more than one same image continues or an image signal having a possibility that a motion amount between frames is large is input, an interpolation vector is made to zero-vector forcibly and motion compensation processing is made ineffective. According to this, in the same manner as the above-described first embodiment, it is possible to eliminate detection error of a motion vector, motion compensation error, and the like due to discontinuity of motion of an image and large amount of motion between frames and to effectively prevent deterioration in image quality caused by FRC processing of a motion compensation type.

Third Embodiment

In a third embodiment of the present invention, a path for bypassing the FRC portion 10 is provided, and when an input image signal is an image signal obtained by special reproduction including "fast forward reproduction", "rewind reproduction", "slow reproduction", and "frame advance reproduction" in a video reproducing device, for example, the input image signal is input to the bypass side to change a driving frequency of the liquid crystal display panel 19 in accordance with a frame frequency of the input image signal. That is, when an image signal obtained by special reproduction is input, the frame rate conversion is not performed and the input image signal is output to the liquid crystal display panel 19 to be displayed as it is.

Figure 8:
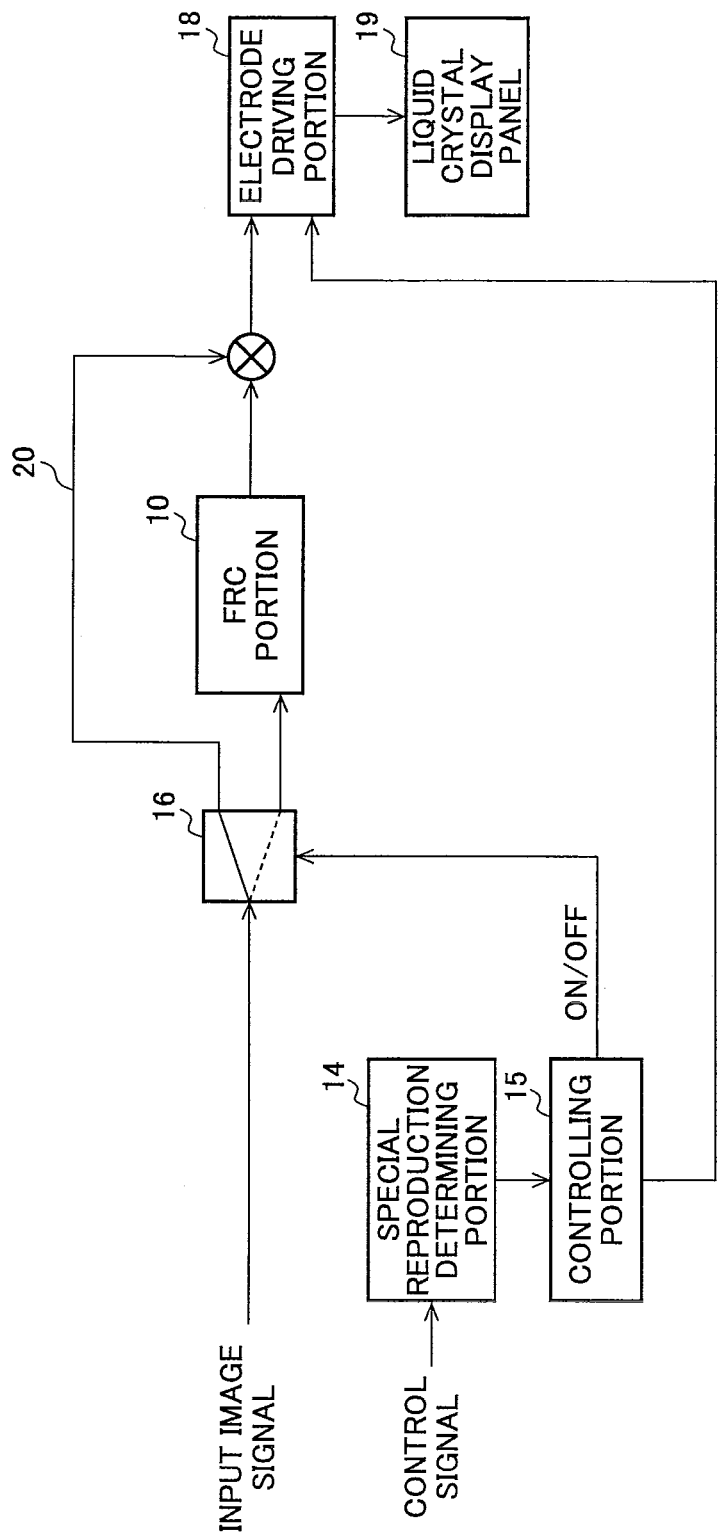
FIG. 8 is a block diagram showing an example of the structure of the essential parts of a liquid crystal displaying device according to a third embodiment of the present invention.

FIG. 8 is a block diagram showing an example of the structure of the essential parts of a liquid crystal displaying device according to the third embodiment of the present invention, and the liquid crystal displaying device is comprises the FRC portion 10, the special reproduction determining portion 14, the controlling portion 15, the switching portion 16, the electrode driving portion 18, the liquid crystal display panel 19, and further a path 20 for bypassing the FRC portion 10. The switching portion 16 is provided in the front stage of the FRC portion 10, and switches the input of an input image signal from the FRC portion 10 to the path 20, or vice versa, in accordance with an instruction from the controlling portion 15.

When the special reproduction determining portion 14 determines that an input image signal is an image signal obtained by special reproduction, the controlling portion 15 switches the connection of the switching portion 16 to the side of the path 20 to bypass the FRC portion 10. Moreover, when the special reproduction determining portion 14 determines that an input image signal is an image signal obtained by normal reproduction, the connection of the switching portion 16 is switched to the side of the FRC portion 10 to perform FRC processing (motion compensation frame interpolation processing) to the input image signal. Note that, it may be configured so that the switching portion 16 is provided in the rear stage of the FRC portion 10 and an output signal from the FRC portion 10 and an output signal from the path 20 are output to the liquid crystal display panel 19 through the path changed by the switching portion 16, respectively.

In the third embodiment shown in FIG. 8, the controlling portion 15 is capable of changing a driving frequency of the liquid crystal display panel 19, and when an image signal obtained by special reproduction is input, inputs an input image signal to the side of the path 20 and changes the driving frequency of the liquid crystal display panel 19 in accordance with the frame frequency of the input image signal.

Figure 9:
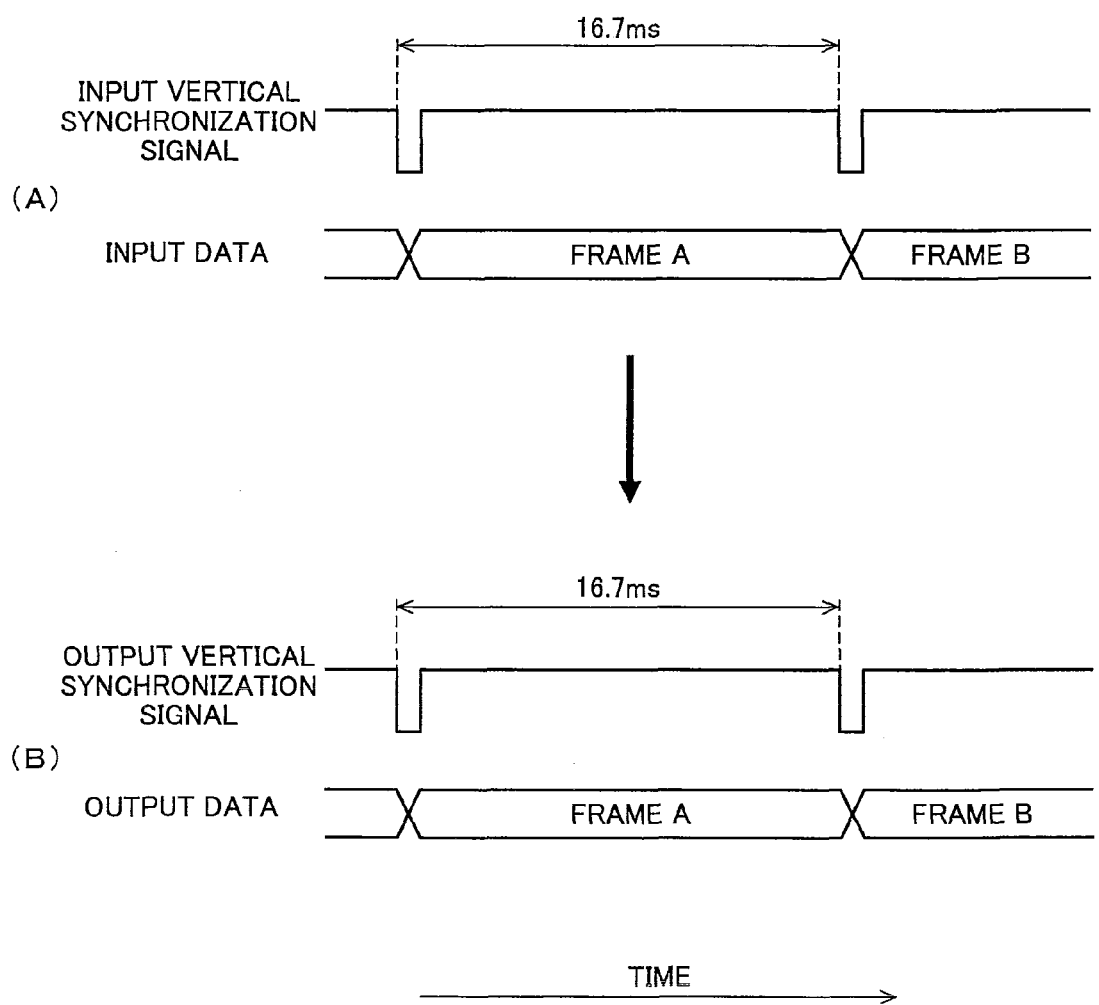
FIG. 9 is a view showing relationship between input data and output data according to the third embodiment of the present invention.

FIG. 9 is a view showing relationship between input data and output data according to the third embodiment of the present invention. FIG. 9(A) shows input data to the path 20, and FIG. 9(B) shows output data from the path 20. As shown in FIG. 9(A), when an input image signal (input data) is input to the path 20 with a frame frequency of 60 Hz, a display time per one frame is about 16.7 ms. The controlling portion 15 controls the electrode driving portion 18 that is a display driver and changes a driving frequency of the liquid crystal display panel from 120 Hz to 60 Hz and outputs the above-described input data with 60 Hz from the path 20 without converting its frame rate, as shown in FIG. 9(B).

Since the liquid crystal display panel 19 displays the frame output from the path 20 without converting the frame number with a driving frequency of 60 Hz, a display time per one frame at this time remains about 16.7 ms.

In this way, it is possible to improve quality of a moving image by FRC processing of a motion compensation type at the time of ordinary display of a moving image. Along with that, when an image signal obtained by special reproduction is input, that is, when an image signal having a possibility that more than one same image continues or an image signal having a possibility that a motion amount between frames is large is input, it is possible to eliminate detection error of a motion vector, motion compensation error, and the like due to discontinuity of motion of an image and large amount of motion between frames and to effectively prevent deterioration in image quality caused by FRC processing of a motion compensation type by bypassing FRC processing and prohibiting the frame rate conversion itself.

Fourth Embodiment

In a fourth embodiment of the present invention, a path for bypassing the FRC portion 10 is provided, and when an input image signal is an image signal obtained by special reproduction including "fast forward reproduction", "rewind reproduction", "slow reproduction", and "frame advance reproduction" in a video reproducing device, for example, the input image signal is input to the bypass side, the input image signal is stored in a memory on the path, and an image signal of the same frame is repeatedly read from the memory twice or more at a high speed to perform frame rate conversion. That is, when an image signal obtained by special reproduction is input, the input image signal is repeatedly output at a high speed to convert a frame rate without performing the frame rate conversion of a motion compensation type and output to the liquid crystal display panel 19 to displayed.

Figure 10:
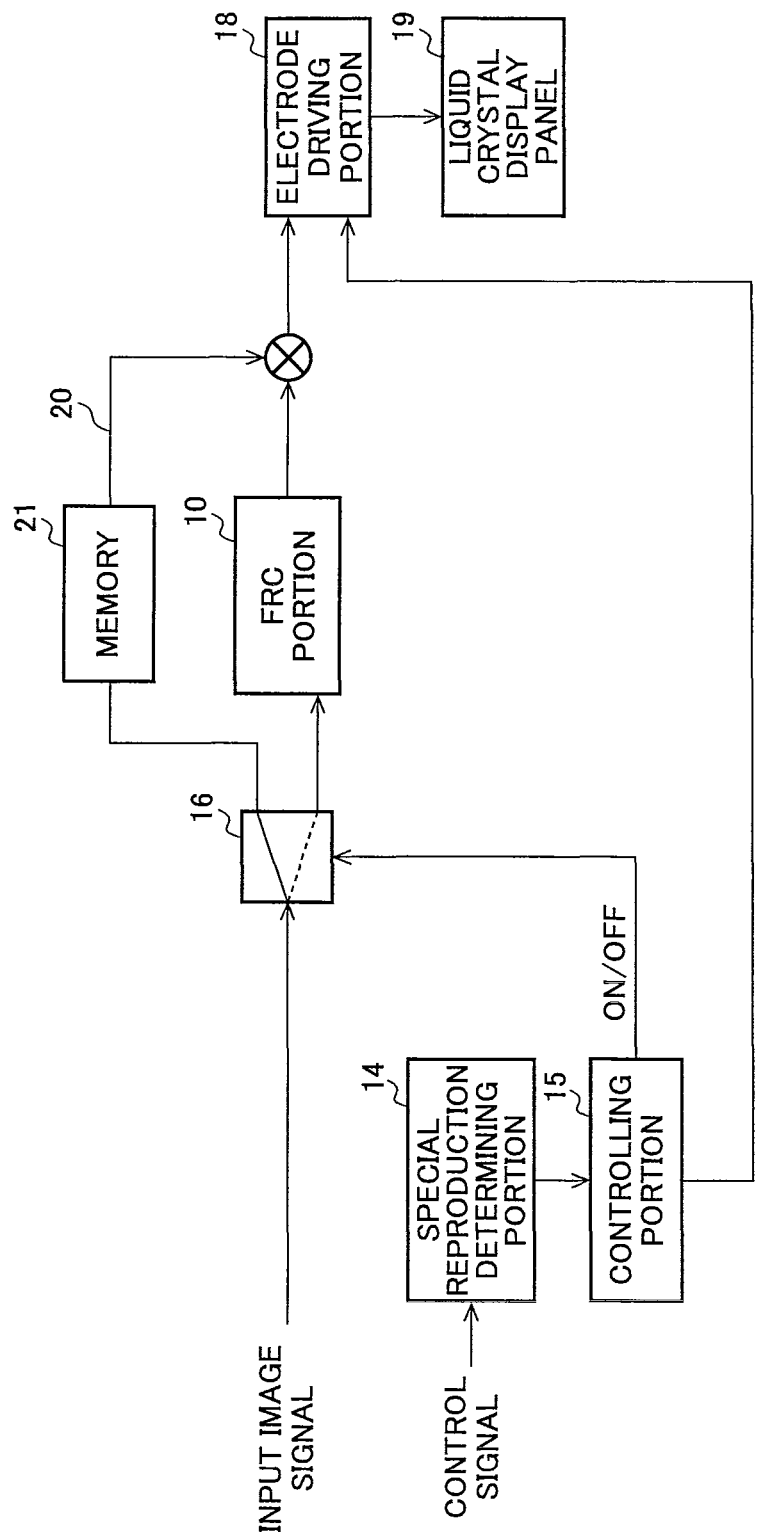
FIG. 10 is a block diagram showing an example of the structure of the essential parts of a liquid crystal displaying device according to a fourth embodiment of the present invention.

FIG. 10 is a block diagram showing an example of the structure of the principle part of a liquid crystal displaying device according to the fourth embodiment of the present invention, and the liquid crystal displaying device comprises the FRC portion 10, the special reproduction determining portion 14, the controlling portion 15, the switching portion 16, the electrode driving portion 18, the liquid crystal display panel 19, and further the path 20 for bypassing the FRC portion 10 and a memory 21 on the path 20. The switching portion 16 is provided in the front stage of the FRC portion 10, and switches the input of an input image signal from the FRC portion 10 to the path 20, or vice versa, in accordance with an instruction from the controlling portion 15.

When the special reproduction determining portion 14 determines that an input image signal is an image signal obtained by special reproduction, the controlling portion 15 switches the connection of the switching portion 16 to the side of the path 20 to bypass the processing of the FRC portion 10 and stores the input image signal in the memory 21. Thereafter, the same frame is repeatedly read from the memory 21 twice or more to perform frame insertion processing. Moreover, when the special reproduction determining portion 14 determines that an input image signal is an image signal obtained by normal reproduction, the connection of the switching portion 16 is switched to the side of the FRC portion 10 to perform FRC processing (motion compensation frame interpolation processing) for the input image signal. Note that, it may be configured so that the switching portion 16 is provided in the rear stage of the FRC portion 10 and an output signal from the FRC portion 10 and an output signal from the memory 21 are output to the liquid crystal display panel 19 through the path changed by the switching portion 16, respectively.

In the present embodiment, a driving frequency of the liquid crystal display panel 19 is not changed to remain at 120 Hz. The controlling portion 15 and the memory 21 constitute a portion that converts the number of frames of the input image signal by inserting an image signal of a previous or subsequent frame between frames of the input image signal when an image signal obtained by special reproduction is input. That is, the frame rate (the number of frames) of a display image signal input to the electrode driving portion 18 is always the same.

Figure 11:
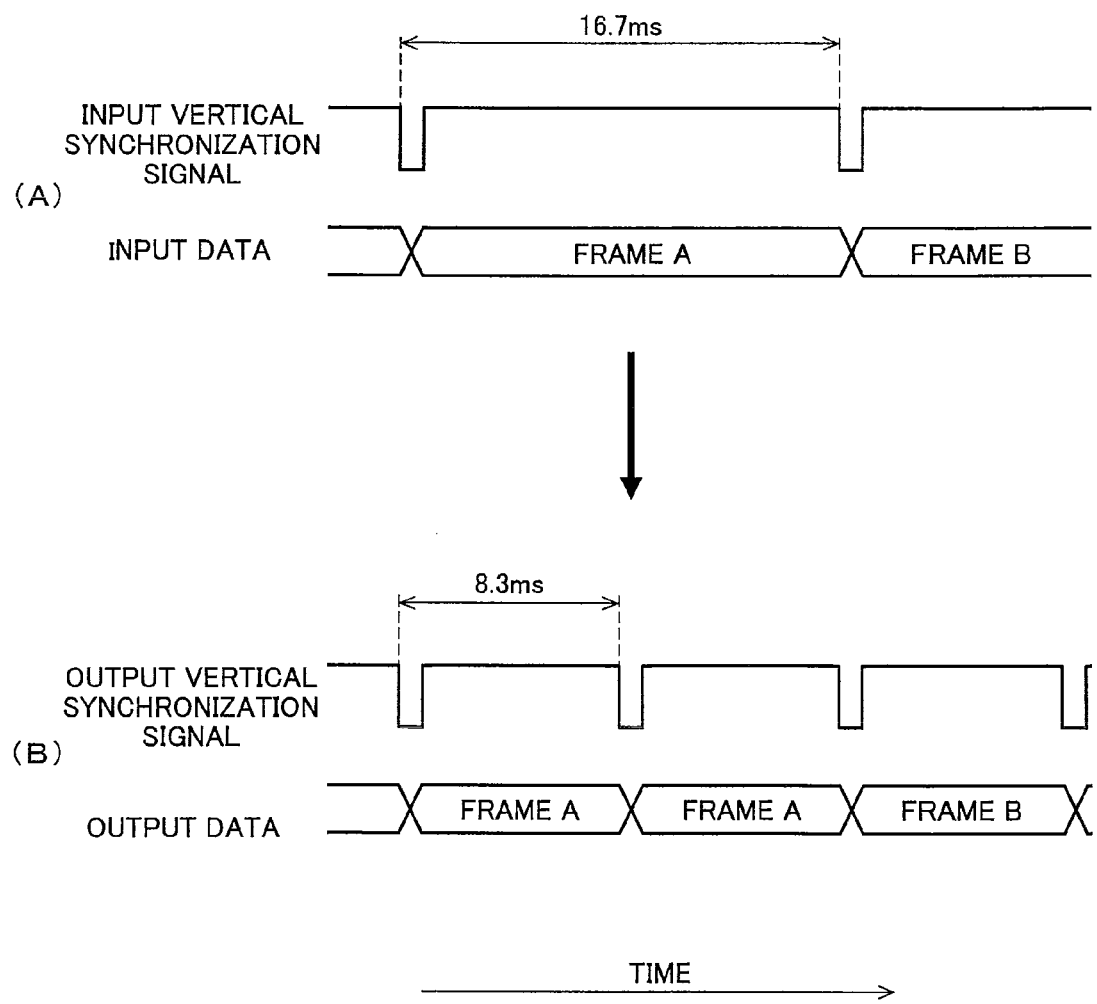
FIG. 11 is a view showing relationship between input data and output data according to the fourth embodiment of the present invention.

FIG. 11 is a view showing relationship between input data and output data according to the fourth embodiment of the present invention. FIG. 11(A) shows input data to the path 20, and FIG. 11(B) shows output data from the path 20. As shown in FIG. 11(A), when an input image signal (input data) is input to the path 20 with a frame frequency of 60 Hz, a display time per one frame is about 16.7 ms. The above-described input data is temporarily stored in the memory 21, and as shown in FIG. 11(B), an image signal of a frame (frame A in the figure) repeatedly read from the memory 21 at a double speed is output.

The liquid crystal display panel 19 displays the output data in which an image signal of the same frame is inserted with a driving frequency of 120 Hz. Note that, since the number of frames is converted when the same frame is repeatedly read twice, the display time per one frame at this time becomes about 8.3 ms.

In this way, it is possible to improve quality of a moving image by FRC processing of a motion compensation type at the time of ordinal display of a moving image, and when an image signal obtained by special reproduction is input, that is, when an image signal having a possibility that more than one same image continues or an image signal having a possibility that a motion amount between frames is large is input, it is possible to eliminate detection error of a motion vector, motion compensation error, and the like due to discontinuity of an image and large amount of motion between frames and to effectively prevent deterioration in image quality caused by FRC processing of a motion compensation type by not performing interpolation processing by motion compensation to the input image signal. Further, in this case, since a frame rate is converted by reading out the same frame repeatedly, it is not necessary to change a driving frequency of the liquid crystal display panel 19.

Fifth Embodiment

In a fifth embodiment of the present invention, a path for bypassing the FRC portion 10 is provided, and when an input image signal is an image signal obtained by special reproduction including "fast forward reproduction", "rewind reproduction", "slow reproduction", and "frame advance reproduction" in a video reproducing device, for example, the input image signal is input to the bypass side and the input image signal is input to a linear interpolation processing portion on the path to interpolate an image signal to which linear interpolation has been performed. That is, when an image signal obtained by special reproduction is input, a frame rate is converted by performing linear interpolation processing not by performing interpolation processing by motion compensation.

Figure 12:
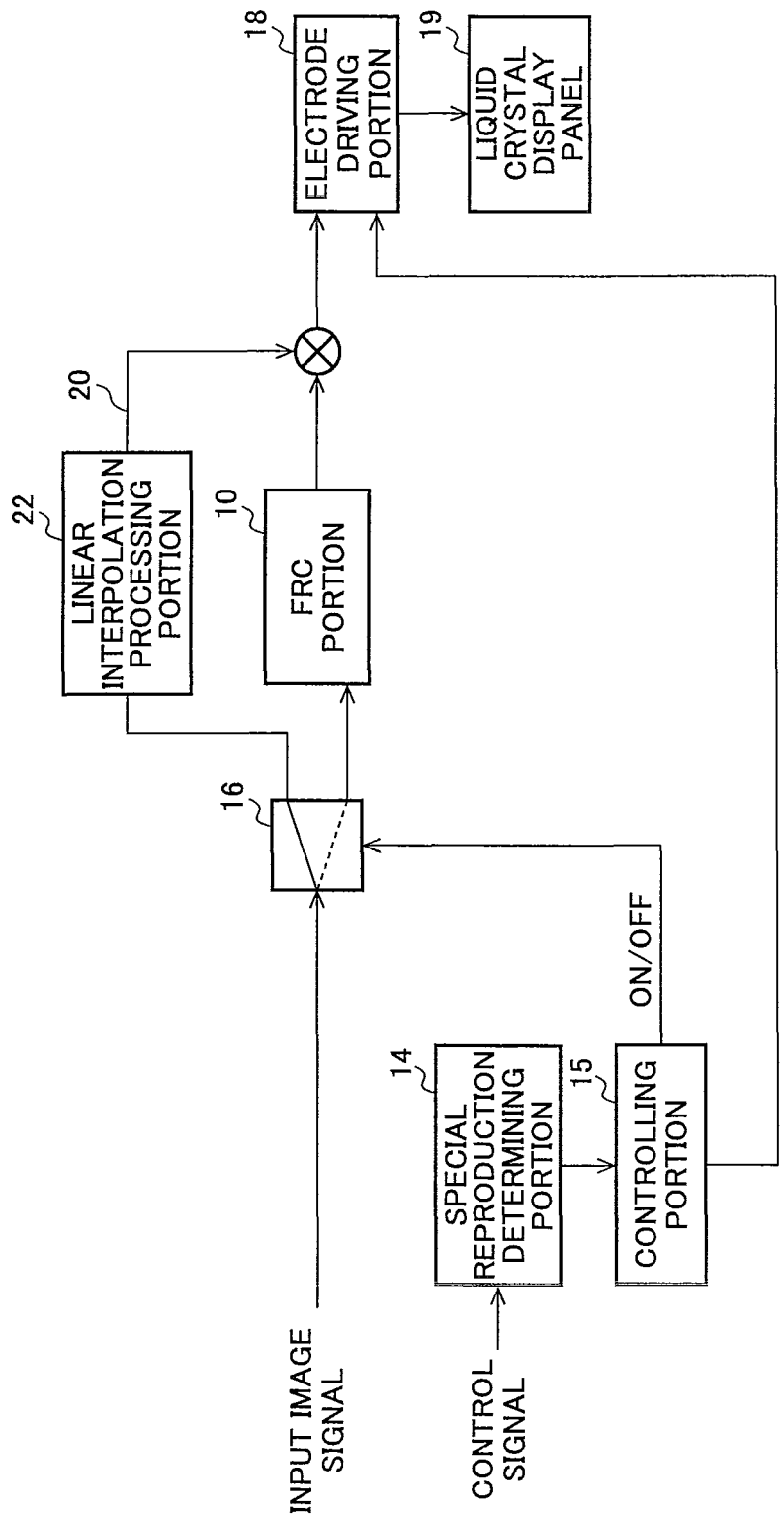
FIG. 12 is a block diagram showing an example of the structure of the essential parts of a liquid crystal displaying device according to a fifth embodiment of the present invention.

FIG. 12 is a block diagram showing an example of the structure of the essential parts of a liquid crystal displaying device according to the fifth embodiment of the present invention, and the liquid crystal displaying device comprises the FRC portion 10, the special reproduction determining portion 14, the controlling portion 15, the switching portion 16, the electrode driving portion 18, the liquid crystal display panel 19, and further the path 20 for bypassing the FRC portion 10 and a linear interpolation processing portion 22 on the path 20. The switching portion 16 is provided in the front stage of the FRC portion 10, and switches the input of an input image signal from the FRC portion 10 and to the path 20, or vice versa, in accordance with an instruction from the controlling portion 15.

When the special reproduction determining portion 14 determines that an input image signal is an image signal obtained by special reproduction, the controlling portion 15 switches the connection of the switching portion 16 to the side of the path 20 to bypass the FRC portion 10, and inputs the input image signal to the linear interpolation processing portion 22. The linear interpolation processing portion 22 inserts an interpolation frame to which linear interpolation processing has been performed between frames. Moreover, when the special reproduction determining portion 14 determines that an input image signal is an image signal obtained by normal reproduction, the connection of the switching portion 16 is switched to the side of the FRC portion 10 to perform FRC processing (motion compensation frame interpolation processing) to the input image signal. Note that, it may be configured so that the switching portion 16 is provided in the rear stage of the FRC portion 10 and an output signal from the FRC portion 10 and an output signal from the linear interpolation processing portion 22 are output to the liquid crystal display panel 19 through the path changed by the switching portion 16, respectively.

In the present embodiment, a driving frequency of the liquid crystal display panel 19 is not changed to remain at 120 Hz. That is, a frame rate (the number of frames) of a display image signal input to the electrode driving portion 18 is always the same. When an image signal obtained by special reproduction is input, the linear interpolation processing portion 22 constitutes a portion that converts the number of frames of the input image signal by interpolating an image signal to which linear interpolation processing has been performed between frames of the input image signal. Note that, as described in the foregoing "television system conversion", Tatsuro Yamauchi, Journal of the Institute of Television Engineers of Japan, Vol. 45, No. 12, pp. 1534-1543 (1991), the linear interpolation processing is to obtain an interpolation frame by linear interpolation with a frame interpolation rate α from a signal of a previous frame and a signal of a current frame.

Figure 13:
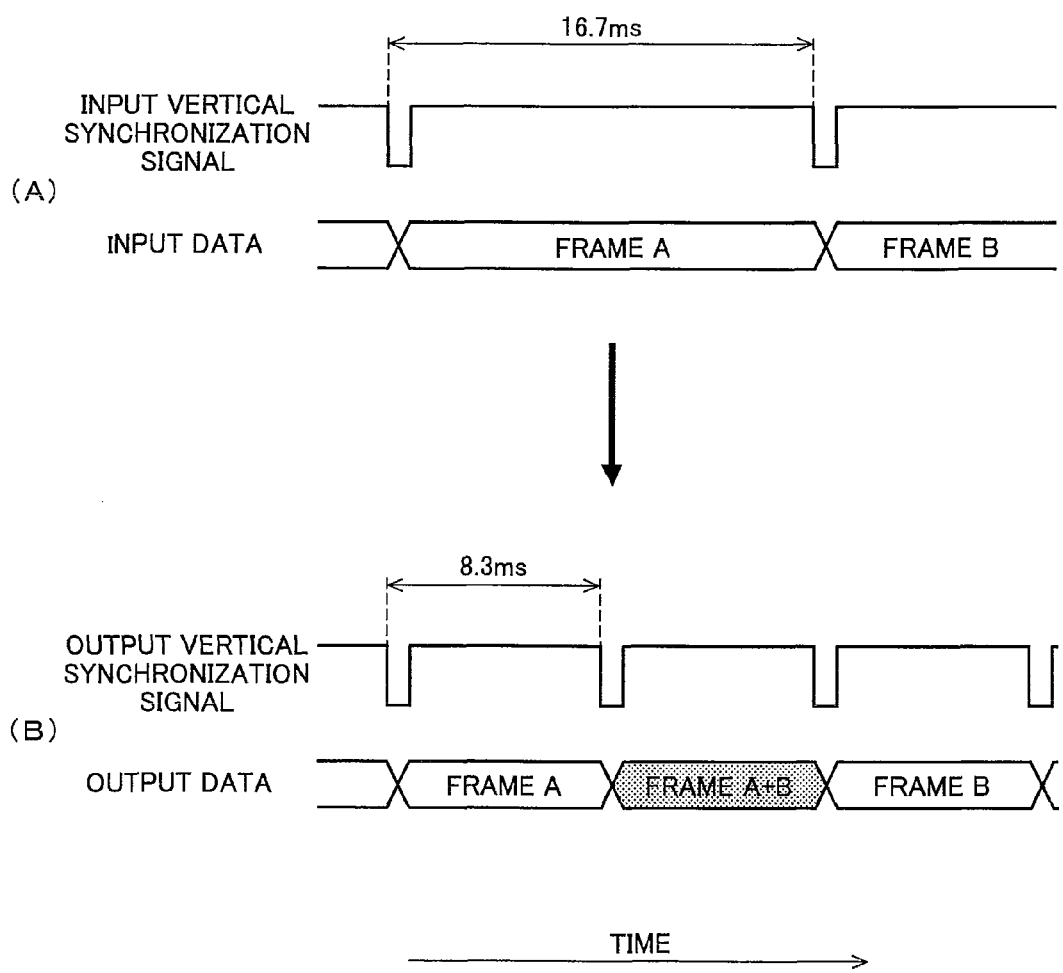
FIG. 13 is a view showing relationship between input data and output data according to the fifth embodiment of the present invention.

FIG. 13 is a view showing relationship between input data and output data according to the fifth embodiment of the present invention. FIG. 13(A) shows input data to the path 20, and FIG. 13(B) shows output data from the path 20. As shown in FIG. 13(A), when an input image signal (input data) is input to the path 20 with a frame frequency of 60 Hz, a display time per one frame is about 16.7 ms. The above-described input data is input to the linear interpolation processing portion 22, and as shown in FIG. 13(B), an image signal to which linear interpolation processing has been performed between frames (here, between frame A and frame B) (frames A+B) is interpolated and output.

The liquid crystal display panel 19 displays output data into which an image signal to which linear interpolation processing has been performed is interpolated with a driving frequency of 120 Hz. Note that, since the number of frames is converted by interpolating the image signal to which linear interpolation processing has been performed, a display time per one frame at this time becomes about 8.3 ms.

In this way, it is possible to improve quality of a moving image by FRC processing of a motion compensation type at the time of ordinal display of a moving image, and when an image signal obtained by special reproduction is input, that is, when an image signal having a possibility that more than one same image continues or an image signal having a possibility that a motion amount between frames is large is input, it is possible to eliminate detection error of a motion vector, motion compensation error, and the like due to discontinuity of an image and large amount of motion between frames and to effectively prevent deterioration in image quality caused by FRC processing of a motion compensation type by not performing interpolation processing by motion compensation to the input image signal. Further, in this case, since a frame rate is converted by interpolating an image signal to which linear interpolation processing has been performed, it is not necessary to change a driving frequency of the liquid crystal display panel 19.

Sixth Embodiment

In a sixth embodiment of the present invention, a path for bypassing the FRC portion 10 is provided, and when an input image signal is an image signal obtained by special reproduction including "fast forward reproduction", "rewind reproduction", "slow reproduction", and "frame advance reproduction" in a video reproducing device, for example, the input image signal is input to the bypass path side and the input image signal is input to a black level signal insertion processing portion on the path to insert a predetermined monochrome image signal such as a black level signal. That is, when an image signal obtained by special reproduction is input, a frame rate is converted by performing monochrome image insertion processing not by performing interpolation processing by motion compensation.

Figure 14:
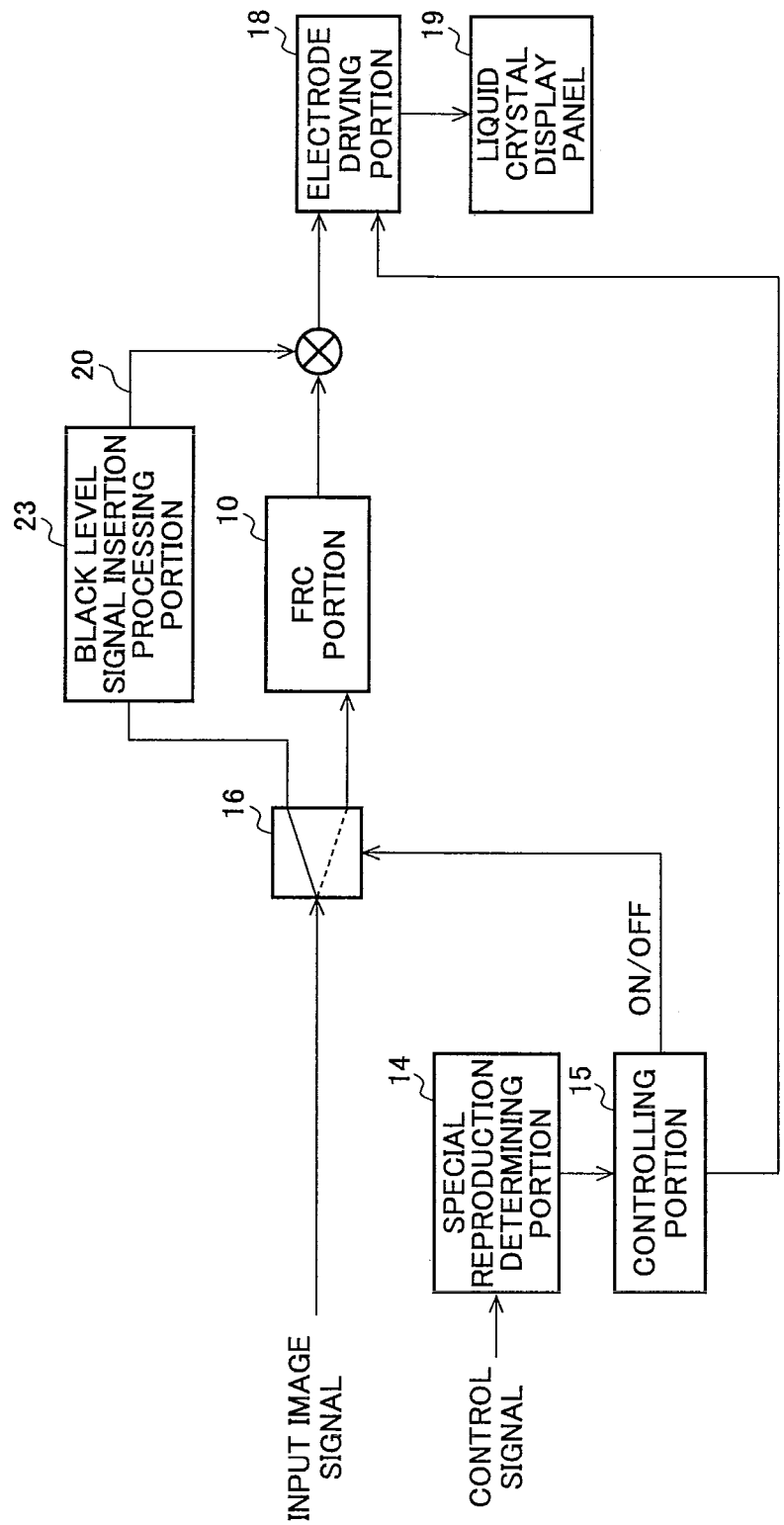
FIG. 14 is a block diagram showing an example of the structure of the essential parts of a liquid crystal displaying device according to a sixth embodiment of the present invention.

FIG. 14 is a block diagram showing an example of the structure of the essential parts of a liquid crystal displaying device according to the sixth embodiment of the present invention, and the liquid crystal displaying device comprises the FRC portion 10, the special reproduction determining portion 14, the controlling portion 15, the switching portion 16, the electrode driving portion 18, the liquid crystal display panel 19, and further the path 20 for bypassing the FRC portion 10 and a black level signal insertion processing portion 23 on the path 20. The switching portion 16 is provided in the front stage of the FRC portion 10, and switches the input of an input image signal from the FRC portion 10 to the path 20, or vice versa, in accordance with an instruction from the controlling portion 15.

When the special reproduction determining portion 14 determines that an input image signal is an image signal obtained by special reproduction, the controlling portion 15 switches the connection of the switching portion 16 to the side of the path 20 to bypass the FRC portion 10, and inputs the input image signal to the black level signal insertion processing portion 23. The black level signal insertion processing portion 23 performs time axis compression (frame rate conversion) of the input image signal using a memory, for example, and inserts a predetermined monochrome image signal such as a black level signal between input frames. Moreover, when the special reproduction determining portion 14 determines that an input image signal is an image signal obtained by normal reproduction, the connection of the switching portion 16 is switched to the side of the FRC portion 10 to perform FRC processing (motion compensation frame interpolation processing) to the input image signal. Note that, it may be configured so that the switching portion 16 is provided to the rear stage of the FRC portion 10 and an output signal from the FRC portion 10 and an output signal from the black level signal insertion processing portion 23 are output to the liquid crystal display panel 19 through the path changed by the switching portion 16, respectively.

In the present embodiment, a driving frequency of the liquid crystal display panel 19 is not changed to remain at 120 Hz. That is, a frame rate (the number of frames) of a display image signal input to the electrode driving portion 18 is always the same. When an image signal obtained by special reproduction is input, the black level signal insertion processing portion 23 constitutes a portion that converts the number of frames of the input image signal by inserting a predetermined monochrome image signal such as a black level signal between frames of the input image signal. In addition, as another embodiment of the black level signal insertion processing, it may be configured so that a black writing voltage is applied to the liquid crystal display panel 19 for a predetermined term (1/120 second in the present example) by the electrode driving portion 18.

Figure 15:
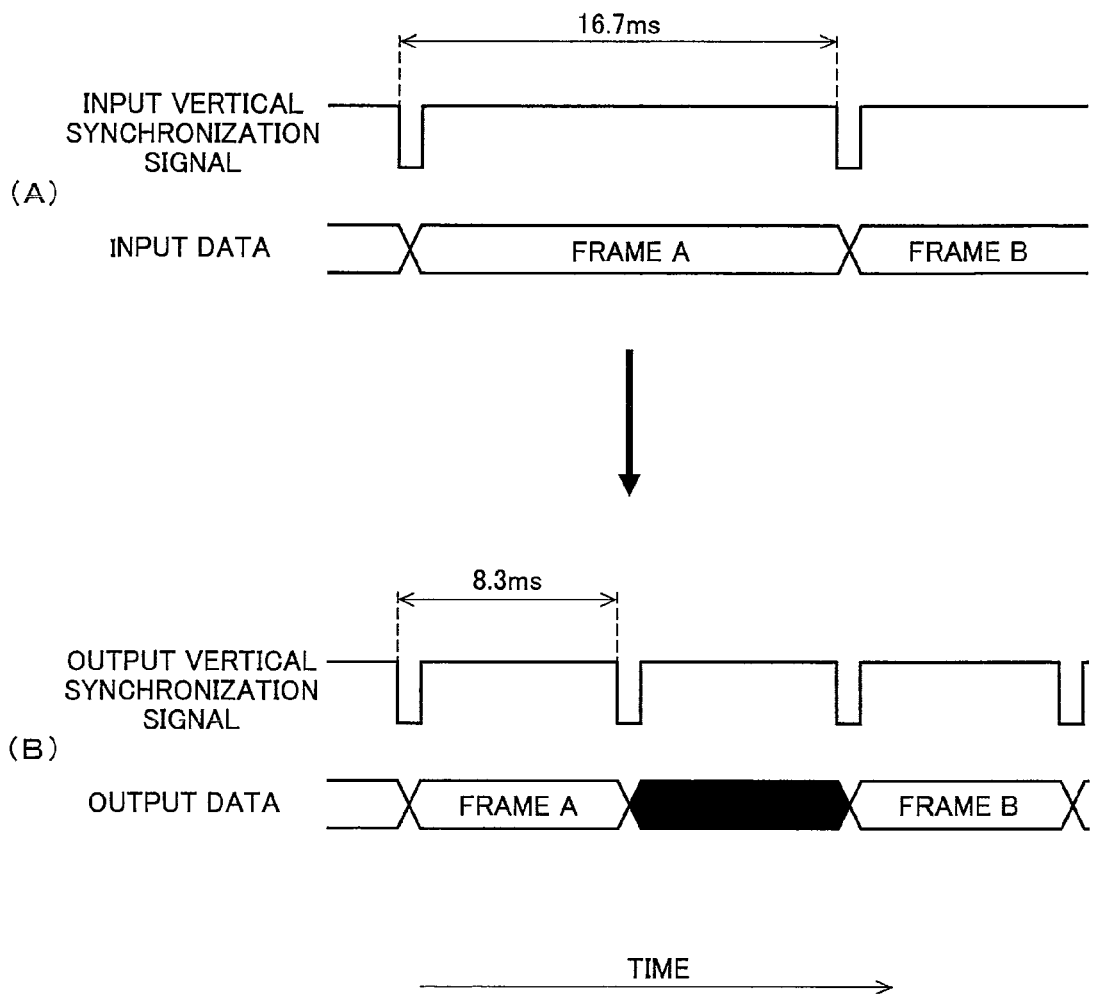
FIG. 15 is a view showing relationship between input data and output data according to the sixth embodiment of the present invention.

FIG. 15 is a view showing relationship between input data and output data according to the sixth embodiment of the present invention. FIG. 15(A) shows input data to the path 20, and FIG. 15(B) shows output data from the path 20. As shown in FIG. 15(A), when an input image signal (input data) is input to the path 20 with a frame frequency of 60 Hz, a display time per one frame is about 16.7 ms. The above-described input data is input to the black level signal insertion processing portion 23, and as shown in FIG. 15(B), a black level signal (a frame colored in black) is inserted between frames (here, between frame A and frame B) to be output.

In this way, when a black image signal is inserted between respective frames of an input image signal, deterioration in image quality due to a motion blur is improved and further, deterioration in image quality due to motion compensation error is not generated. However, in this case, in order to compensate the decrease in the display luminance due to shortening of an image display term, it is necessary to increase the light emission luminance of a back light (not shown) provided on the back of the liquid crystal display panel 19.

The liquid crystal display panel 19 displays output data in which a black level signal is inserted with a driving frequency of 120 Hz. Note that, since the number of frames is converted by inserting the black level signal, a display time per one frame at this time becomes about 8.3 ms.

In this way, it is possible to improve quality of a moving image by FRC processing of a motion compensation type at the time of ordinal display of a moving image, and when an image signal obtained by special reproduction is input, that is, when an image signal having a possibility that more than one same image continues or an image signal having a possibility that a motion amount between frames is large is input, it is possible to eliminate detection error of a motion vector, motion compensation error, and the like due to discontinuity of an image and large amount of motion between frames and to effectively prevent deterioration in image quality caused by FRC processing of a motion compensation type by not performing interpolation processing by motion compensation to the input image signal. Further, in this case, since a frame rate is converted by inserting a monochrome image signal, it is not necessary to change a driving frequency of the liquid crystal display panel 19. In addition, in this case, it is also possible to maintain the effect of improving the quality of a moving image.

Note that, in addition to the above-described embodiment, when an input image signal is an image signal obtained by special reproduction including "fast forward reproduction", "rewind reproduction", "slow reproduction", and "frame advance reproduction" in a video reproducing device, for example, the effect of improving the quality of a moving image may be maintained and the deterioration in the image quality caused by FRC processing of a motion compensation type may be prevented at the same time by converting a frame rate after dividing an original image of an input frame into a plurality of frame images with a predetermined luminance ratio.

Seventh Embodiment

A seventh embodiment of the present invention is configured so that, when an input image signal is an image signal obtained by special reproduction including "fast forward reproduction", "rewind reproduction", "slow reproduction", and "frame advance reproduction" in a video reproducing device, for example, compensation intensity for motion compensation processing in an interpolation frame generating portion is variable. Specifically, an interpolation frame generating portion that generates an interpolation frame by performing weighted addition of an image signal to which motion compensation processing has been performed and an image signal to which linear interpolation processing has been performed at a predetermined rate is provided, and when an image signal obtained by special reproduction is input, the weighted addition rate is variable.

Figure 16:
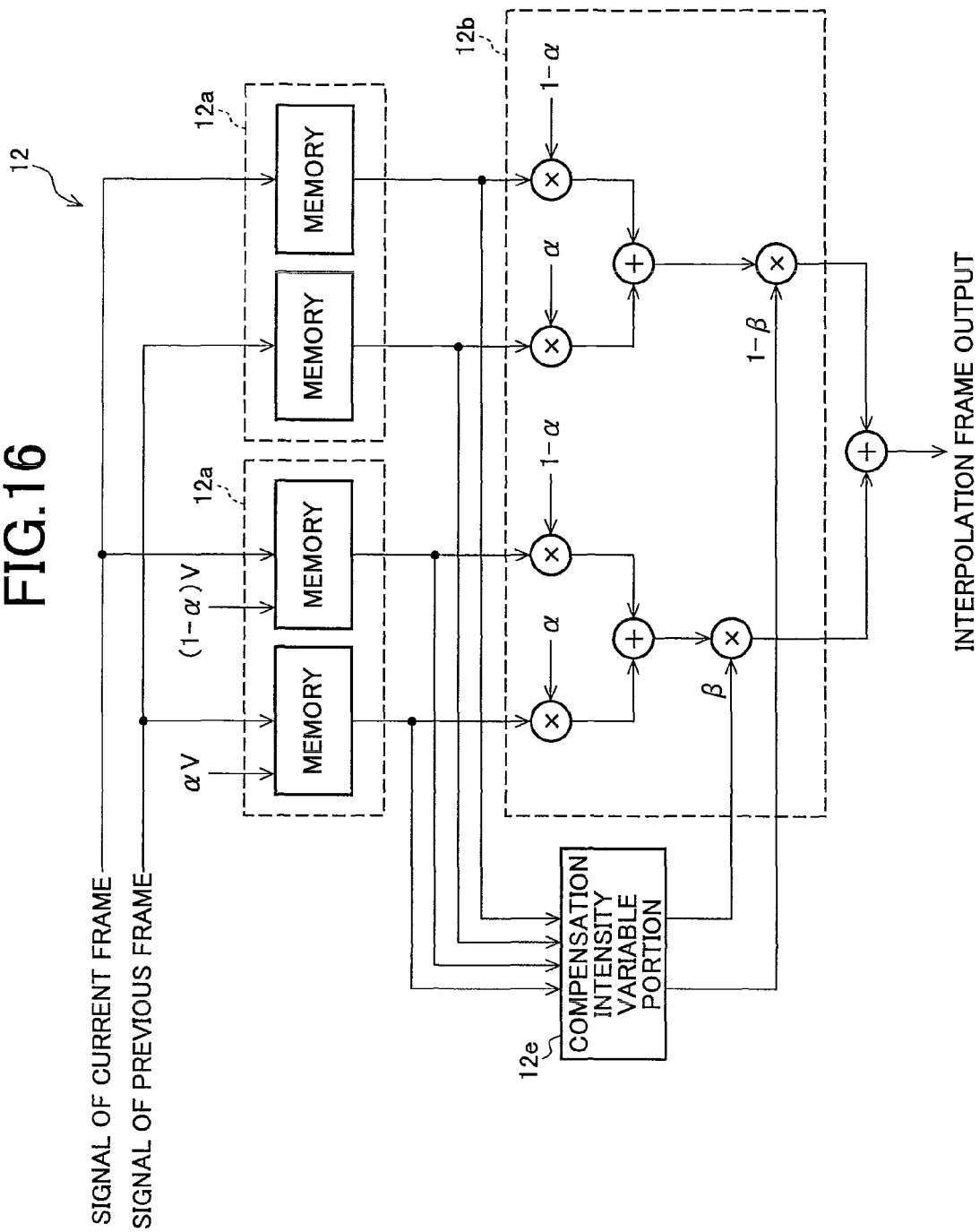
FIG. 16 is a block diagram showing an example of the structure of the essential parts of an FRC portion according to a seventh embodiment of the present invention.

FIG. 16 is a block diagram showing an example of the structure of the essential parts of the FRC portion 10 according to the seventh embodiment of the present invention, and the frame generating portion 12 of the FRC portion 10 comprises a frame memory for interpolation 12a, an interpolation frame generating portion 12b, and further a compensation intensity variable portion 12e for varying compensation intensity of motion compensation processing in the FRC portion 10. In FIG. 16, V shows an interpolation vector, $\alpha$ shows a frame interpolation ratio, $\beta$ shows compensation intensity (weighted addition ratio).

Generally, as a method of frame interpolation processing, for example, frame interpolation by linear interpolation between two frames and frame interpolation using a motion vector (motion compensation interpolation) are known. The former is to obtain an interpolation frame by linear interpolation with a frame interpolation ratio $\alpha$ from a signal of a previous frame and a signal of a current frame. Accordingly, by using the liner interpolation, it is possible to prevent deterioration in image quality due to motion compensation error in FRC processing.

On the other hand, in the latter, in order to obtain an interpolation frame from a previous frame and a current frame, an interpolation vector V is detected from a motion vector between an image of the previous frame and an image of the current frame, and an interpolation frame is obtained by performing weighted addition of the signal which is obtained by shifting the image of the previous frame by the amount of $\alpha$V that is obtained by dividing the value (interpolation vector V) by a frame interpolation ratio $\alpha$ and the signal which is obtained by sifting the image of the current frame by $(1-\alpha)$V. It is possible to obtain an excellent image quality with no deterioration in the resolution by using the interpolation processing of a motion compensation type because a moving image itself is captured to perform the compensation, however, the image quality of a video obtained by special reproduction may be sometimes deteriorated due to this processing.

Therefore, in the present embodiment, the compensation intensity variable portion 12e is provided in the frame generating portion 12. When the special reproduction determining portion 14 determines that an input image signal is an image signal obtained by special reproduction, the compensation intensity variable portion 12e varies the weighted addition ratio $\beta$. The weighted addition ratio $\beta$ is a ratio for performing weighted addition of an image signal to which motion compensation has been performed and an image signal to which linear interpolation processing has been performed. The interpolation frame generating portion 12b of the present embodiment generates an interpolation frame by performing weighted addition of linear interpolation in accordance with the weighted addition ratio $\beta$ and motion compensation interpolation.

For example, when an input image signal is an image signal obtained by special reproduction, the compensation intensity variable portion 12e prevents the deterioration in image quality due to motion compensation error by setting the weighted addition ratio $\beta$=0 and making an image signal to which linear interpolation processing has been performed to an interpolation frame. On the other hand, when an input image signal is an image signal obtained by normal reproduction, the better image quality of a moving image is obtained by setting the weighted addition ratio $\beta$=1 and making an image signal to which motion compensation processing has been performed to an interpolation frame.

In addition, since it is possible to set the weighted addition ratio $\beta$ arbitrarily and variably, it may be set to a value in almost middle between 0 and 1. Thereby, it is possible to appropriately improve both deterioration in image quality due to a motion blur and deterioration in image quality due to motion compensation error, since it is possible to perform the control so that the deterioration in image quality due to motion compensation error is suppressed by performing the motion compensation in an interpolation frame image at the same time.

In this way, when an image signal obtained by special reproduction is input, that is, when an image signal having a possibility that more than one same image continues or an image signal having a possibility that a motion amount between frames is large is input, since the intensity of motion compensation processing in FRC is varied (made lower), the detection error of a motion vector, the motion compensation error, and the like due to discontinuity of an image and large amount of motion between frames are reduced, and it is possible to effectively suppress the deterioration in image quality caused by FRC processing of a motion compensation type.

Figure 17:
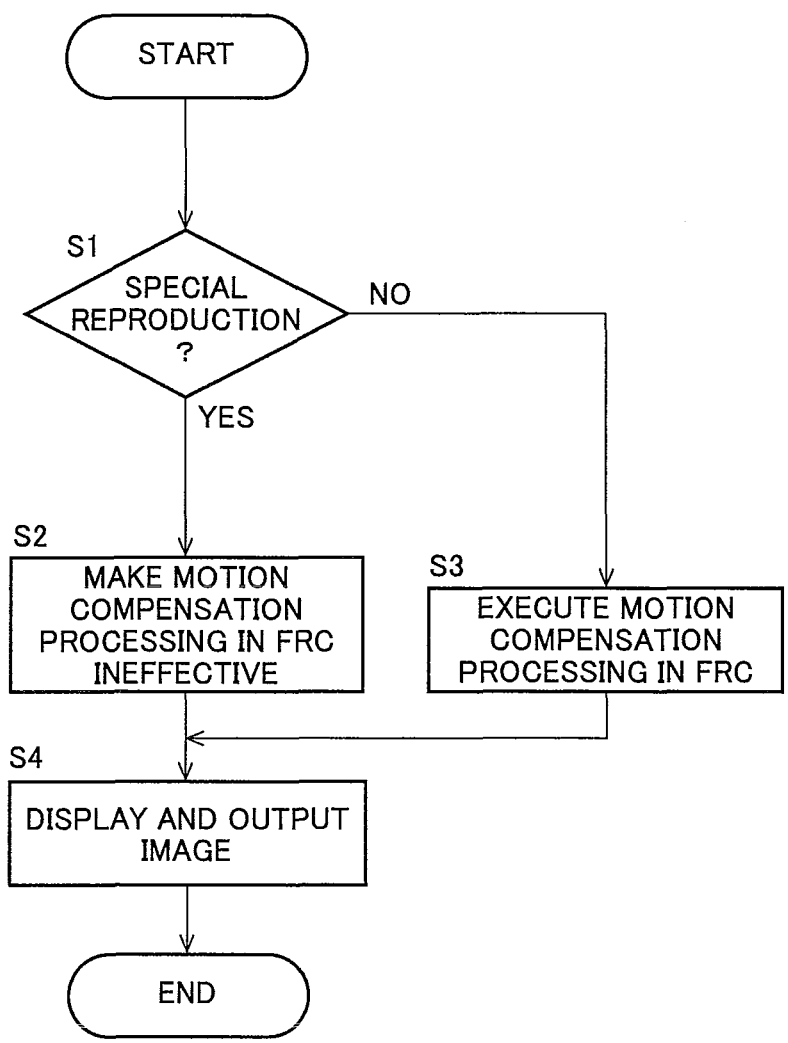
FIG. 17 is a flowchart illustrating an example of an image displaying method by the image displaying device of the present invention.

FIG. 17 is a flowchart illustrating an example of an image displaying method by the image displaying device of the present invention. In FIG. 17, an example of an image displaying method in the above-described first embodiment will be described. First, based on an obtained control signal, the image displaying device determines whether or not an input image signal is an image signal obtained by special reproduction (step S1), and when it is determined to be an image signal obtained by special reproduction (in the case of YES), the motion compensation processing in the FRC portion 10 is made ineffective by making a motion vector or an interpolation vector to zero-vector (step S2). Alternatively, at step S1, when it is determined that the input image signal is not an image signal obtained by special reproduction (in the case of NO), the motion compensation processing in the FRC portion 10 is executed as usual (step S3). The image signal whose frame frequency is converted in this way is displayed and output from the liquid crystal display panel 19 (step S4).

Figure 18:
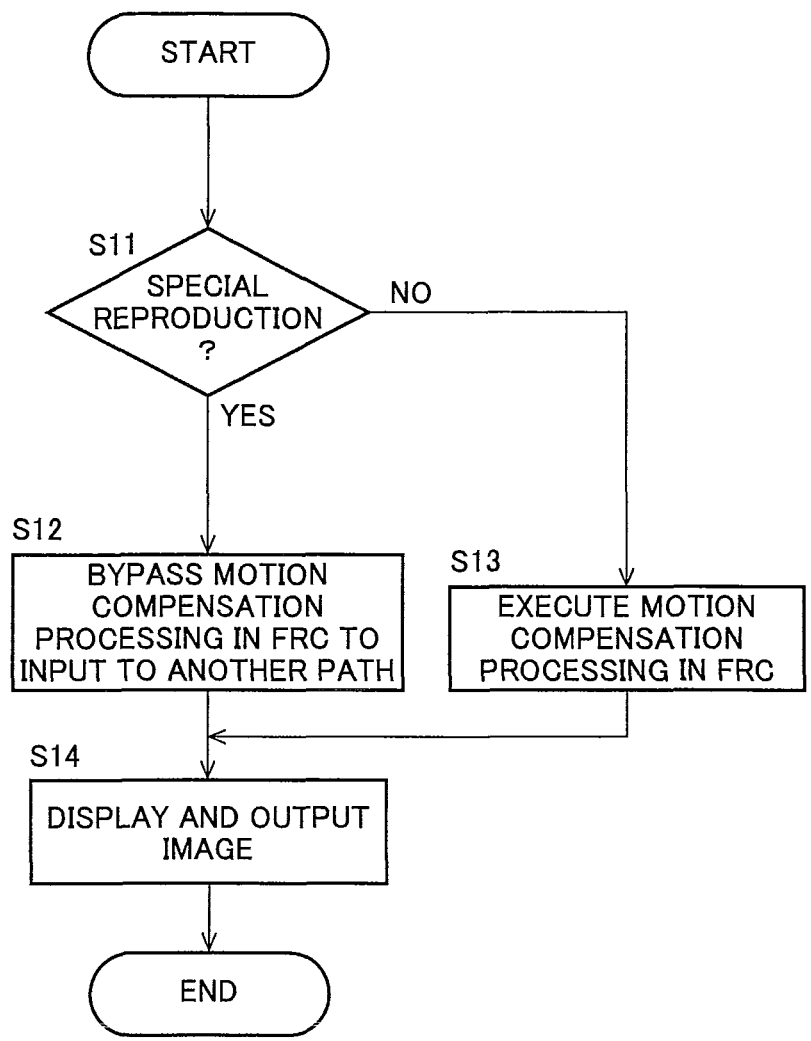
FIG. 18 is a flowchart illustrating another example of the image displaying method by the image displaying device of the present invention.

FIG. 18 is a flowchart illustrating another example of the image displaying method by the image displaying device of the present invention. In FIG. 18, an example of an image displaying method in the above-described second through sixth embodiments will be described. First, based on an obtained control signal, the image displaying device determines whether or not an input image signal is an image signal obtained by special reproduction (step S11), and when it is determined to be an image signal obtained by special reproduction (in the case of YES), the motion compensation frame interpolation processing in the FRC portion 10 is bypassed to input the input image signal to another path 20 (step S12).

Here, in the path 20 as a bypass, an image signal whose frame rate is converted by performing any processing of interpolation of an image signal to which linear interpolation processing has been performed between frames, insertion of an image signal of the same frame between frames, and insertion of a predetermined monochrome image signal such as a black level signal between frames, or the processing for outputting input image signal as it is and changing a driving frequency of the liquid crystal display panel 19 is performed.

Alternatively, at step S11, when it is determined that the input image signal is not an image signal obtained by special reproduction (in the case of NO), an image signal to which interpolation processing by motion compensation has been performed in the FRC portion 10 is output (step S13). Finally, an image is displayed and output from the liquid crystal display panel 19 (step S14).

Figure 19:
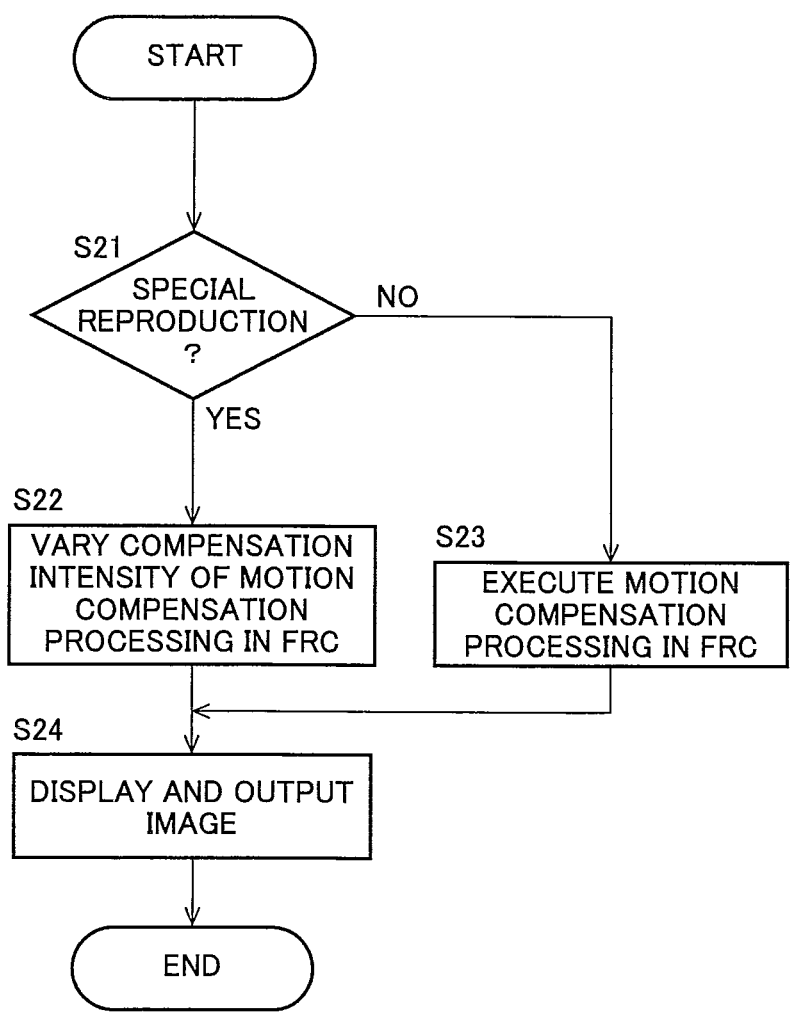
FIG. 19 is a flowchart illustrating another example of the image displaying method by the image displaying device of the present invention.

FIG. 19 is a flowchart illustrating another example of the image displaying method by the image displaying device of the present invention. In FIG. 19, an example of an image displaying method in the above-described seventh embodiment will be described. First, based on an obtained control signal, the image displaying device determines whether or not an input image signal is an image signal obtained by special reproduction (step S21), and when it is determined to be an image signal obtained by special reproduction (in the case of YES), intensity of motion compensation processing in the FRC portion 10 is varied (made lower) (step S22). Alternatively, when it is determined that the input image signal is not an image signal obtained by special reproduction (in the case of NO), intensity of motion compensation processing in the FRC portion 10 is increased as usual (step S23). The image signal whose frame frequency is converted in this way is displayed and output from the liquid crystal display panel 19 (step S24).

As described above, according to the present invention, when an input image signal is an image signal obtained by special reproduction, that is, an image signal having a possibility that more than one same image continues or an image signal having a possibility that a motion amount between frames is large, since display and output is performed by making the motion compensation processing in the frame rate conversion (FRC) portion ineffective, it is possible to prevent deterioration in image quality due to motion compensation error effectively.

Note that, the above-described input image signal is not restricted to an image signal reproduced from an external medium or an internal medium, but may be a television broadcast signal. Further, it is needless to say that it may be an image signal reproduced from an external server connected through a network.

In addition, in the above-described description, although an example of the embodiments about the image processing device and the method thereof of the present invention have been described, the description also facilitates understanding of an image processing program that executes the present method for processing an image by a computer as a program, and a program recording medium which records the image processing program on a computer readable recording medium.

Furthermore, in the above-described embodiment, although the embodiment in which the image processing device of the present invention is integrally provided in the image displaying device has been described, it is needless to say that the image processing device of the present invention is not restricted to the above and may be provided, for example, in a video output device such as various recording media reproducing devices.

The invention claimed is:

1. An image displaying device having a rate converting portion that converts the number of frames or fields of an input image signal by interpolating an image signal to which motion compensation processing has been applied between frames or fields of the input image signal and outputs the input image signal with the number of frames or fields converted to a display panel, further comprising a determining portion that determines whether or not the input image signal is an image signal obtained by special reproduction, wherein when the determining portion determines that the input image signal is an image signal obtained by special reproduction, image interpolation by the motion compensation processing is not performed by the rate converting portion, wherein the image signal obtained by special reproduction is an image signal obtained by one of fast forward reproduction, rewind reproduction, frame advance reproduction, and slow reproduction.

2. The image displaying device as defined in claim 1, wherein the rate converting portion comprises a portion that generates an interpolation image signal to which motion compensation processing has been performed based on motion vector information between consecutive frames or fields included in the input image signal, and when the determining portion determines that the input image signal is an image signal obtained by special reproduction, the motion compensation processing in the portion for generating the interpolation image signal is made ineffective.

3. The image displaying device as defined in claim 2, wherein the rate converting portion comprises a motion vector detecting portion that detects motion vector information between consecutive frames or fields included in the input image signal, an interpolation vector assigning portion that assigns an interpolation vector between the frames or the fields based on the detected motion vector information, an interpolation image generating portion that generates an interpolation image signal using the assigned interpolation vector, and an image interpolating portion that interpolates the generated interpolation image signal between the frames or the fields.

4. The image displaying device as defined in claim 3, wherein when the determining portion determines that the input image signal is an image signal obtained by special reproduction, the motion compensation processing is made ineffective by making the motion vector detected by the motion vector detecting portion set to zero-vector.

5. The image displaying device as defined in claim 3, wherein when the determining portion determines that the input image signal is an image signal obtained by special reproduction, the motion compensation processing is made ineffective by making the interpolation vector assigned by the interpolation vector assigning portion set to zero-vector.

6. The image displaying device as defined in claim 1, wherein when the determining portion determines that the input image signal is an image signal obtained by special reproduction, the input image signal is output to the display panel without converting the number of frames or fields of the input image signal.

7. The image displaying device as defined in claim 6, wherein
a driving frequency of the display panel for displaying an image signal is variable, and
when the determining portion determines that the input image signal is an image signal obtained by special reproduction, the driving frequency of the display panel is changed in accordance with a frame frequency or a field frequency of the input image signal.

8. The image displaying device as defined in claim 1, wherein
another rate converting portion that converts the number of frames or fields of the input image signal by inserting an image signal to which motion compensation processing has not been applied between the frames or the fields of the input image signal is included, and
when the determining portion determines that the input image signal is an image signal obtained by special reproduction, the image signal with the number of frames or fields converted by the another rate converting portion is output to the display panel.

9. The image displaying device as defined in claim 8, wherein
the another rate converting portion converts the number of frames or fields of the input image signal by inserting an image signal of the frames or the fields between the frames or the fields of the input image signal.

10. The image displaying device as defined in claim 8, wherein
the another rate converting portion converts the number of frames or fields of the input image signal by interpolating an image signal to which linear interpolation processing has been applied between the frames or the fields of the input image signal.

11. The image displaying device as defined in claim 8, wherein
the another rate converting portion converts the number of frames or fields of the input image signal by inserting a predetermined monochrome image signal between the frames or the fields of the input image signal.

12. An image displaying method having a step of converting the number of frames or fields of an input image signal by interpolating an image signal to which motion compensation processing has been applied between frames or fields of the input image signal, the method further comprising
determining whether or not the input image signal is an image signal obtained by special reproduction, wherein
when it is determined that the input image signal is an image signal obtained by special reproduction, image interpolation by the motion compensation processing is not performed,
wherein the image signal obtained by special reproduction is an image signal obtained by one of fast forward reproduction, rewind reproduction, frame advance reproduction, and slow reproduction.

13. The image displaying method as defined in claim 12, wherein
the step of converting the number of frames or fields of the input image signal comprises a process of generating an interpolation image signal to which the motion compensation processing has been performed based on the motion vector information between consecutive frames or fields included in the input image signal, and
when it is determined that the input image signal is an image signal obtained by special reproduction, the motion compensation processing at the step of generating the interpolation image signal is made ineffective.

14. The image displaying method as defined in claim 12, wherein
when it is determined that the input image signal is an image signal obtained by special reproduction, a driving frequency of a display panel is changed in accordance with a frame frequency or a field frequency of the input image signal.

15. The image displaying method as defined in claim 12, wherein
when it is determined that the input image signal is an image signal obtained by special reproduction, the number of frames or fields of the input image signal is converted by inserting an image signal of the frames or the fields between the frames or the fields of the input image signal.

16. The image displaying method as defined in claim 12, wherein
when it is determined that the input image signal is an image signal obtained by special reproduction, the number of frames or fields of the input image signal is converted by interpolating an image signal to which linear interpolation processing has been performed between the frames or the fields of the input image signal.

17. The image displaying method as defined in claim 12, wherein
when it is determined that the input image signal is an image signal obtained by special reproduction, the number of frames or fields of the input image signal is converted by inserting a predetermined monochrome image signal between the frames or the fields of the input image signal.

18. An image processing device having a rate converting portion that converts the number of frames or fields of the input image signal by interpolating an image signal to which motion compensation processing has been performed between frames or fields of an input image signal, wherein
when it is determined that the input image signal is an image signal obtained by special reproduction by a determining portion that determines whether or not the input image signal is an image signal obtained by special reproduction, image interpolation by the motion compensation processing is not performed by the rate converting portion,
wherein the image signal obtained by special reproduction is an image signal obtained by one of fast forward reproduction, rewind reproduction, frame advance reproduction, and slow reproduction.

19. The image processing device as defined in claim 18, wherein
the rate converting portion comprises a portion that generates an interpolation image signal to which the motion compensation processing has been performed based on the motion vector information between consecutive frames or fields included in the input image signal, and
when it is determined that the input image signal is an image signal obtained by special reproduction, the motion compensation processing in the portion for generating the interpolation image signal is made ineffective.

20. The image processing device as defined in claim 18, wherein
when determining portion determines that the input image signal is an image signal obtained by special reproduction, the input image signal is output without converting the number of frames or fields of the input image signal.

21. The image processing device as defined in claim 18, wherein another rate converting portion that converts the number of frames or fields of the input image signal by inserting an image signal to which motion compensation processing has not been applied between the frames or the fields of the input image signal is included, and when it is determined that the input image signal is an image signal obtained by special reproduction, the number of frames or fields of the input image signal is converted by the another rate converting portion.

22. The image processing device as defined in claim 21, wherein the another rate converting portion converts the number of frames or fields of the input image signal by inserting an image signal of the frames or the fields between the frames or the fields of the input image signal.

23. The image processing device as defined in claim 21, wherein the another rate converting portion converts the number of frames or fields of the input image signal by interpolating an image signal to which linear interpolation processing has been applied between the frames or the fields of the input image signal.

24. The image processing device as defined in claim 21, wherein the another rate converting portion converts the number of frames or fields of the input image signal by inserting a predetermined monochrome image signal between the frames or the fields of the input image signal.

25. An image displaying device having rate converting portion that converts the number of frames or fields of an input image signal by interpolating an image signal to which motion compensation processing has been applied between frames or fields of the input image signal and outputs the input image signal with the number of frames or fields converted to a display panel, further comprising a determining portion that determines whether or not the input image signal is an image signal obtained by special reproduction, wherein when the determining portion determines that the input image signal is an image signal obtained by special reproduction, compensation intensity of the motion compensation processing is lowered by the rate converting portion, wherein the image signal obtained by special reproduction is an image signal obtained by one of fast forward reproduction, rewind reproduction, frame advance reproduction, and slow reproduction.

26. The image displaying device as defined in claim 25, wherein the rate converting portion has an interpolation image generating portion that generates an interpolation image signal by performing weighted addition of an image signal to which motion compensation processing has been applied and an image signal to which motion compensation processing has not been applied at a predetermined ratio, and when the determining portion determines that the input image signal is an image signal obtained by special reproduction, the weighted addition ratio is varied.

27. The image displaying device as defined in claim 26, wherein the interpolation image generating portion takes the image signal to which motion compensation processing has not been applied as an interpolation image signal, when the determining portion determines that the input image signal is an image signal obtained by special reproduction, and takes the image signal to which motion compensation processing has been applied as an interpolation image signal when the determining portion determines that the input image signal is not an image signal obtained by special reproduction.

28. The image displaying device as defined in claim 26, wherein the interpolation image generating portion uses an image signal to which linear interpolation processing has been performed as the image signal to which the motion compensation processing has not been performed.

29. The image displaying device as defined in claim 25, wherein the image signal obtained by special reproduction is an image signal obtained by fast forward reproduction.

30. The image displaying device as defined in claim 25, wherein the image signal obtained by special reproduction is an image signal obtained by rewind reproduction.

31. The image displaying device as defined in claim 25, wherein the image signal obtained by special reproduction is an image signal obtained by frame advance reproduction.

32. The image displaying device as defined in claim 25, wherein the image signal obtained by special reproduction is an image signal obtained to slow reproduction.

33. An image displaying method having a step of converting the number of frames or fields of an input image signal by interpolating an image signal to which motion compensation processing has been applied between frames or fields of the input image signal, the method further comprising determining whether or not the input image signal is an image signal obtained by special reproduction, wherein when it is determined that the input image signal is an image signal obtained by special reproduction, compensation intensity of the motion compensation processing is lowered, wherein the image signal obtained by special reproduction is an image signal obtained by one of fast forward reproduction, rewind reproduction, frame advance reproduction, and slow reproduction.

34. An image processing device having a rate converting portion that converts the number of frames or fields of the input image signal by interpolating an image signal to which motion compensation processing has been performed between frames or fields of an input image signal, wherein when it is determined that the input image signal is an image signal obtained by special reproduction by a determining portion that determines whether or not the input image signal is an image signal obtained by special reproduction, compensation intensity of the motion compensation processing is lowered by the rate converting portion, wherein the image signal obtained by special reproduction is an image signal obtained by one of fast forward reproduction, rewind reproduction, frame advance reproduction, and slow reproduction.

35. A image processing method having a step of converting the number of frames or fields of an input image signal by interpolating an image signal to which motion compensation processing has been applied between frames or fields of the input image signal, the method further comprising determining whether or not the input image signal is an image signal obtained by special reproduction, and when it is determined that the input image signal is an image signal obtained by special reproduction, compensation intensity of the motion compensation processing is lowered, wherein the image signal obtained by special reproduction is an image signal obtained by one of fast forward reproduction, rewind reproduction, frame advance reproduction, and slow reproduction.

* * * * *